US011119720B2

(12) United States Patent
Kim et al.

(10) Patent No.: US 11,119,720 B2
(45) Date of Patent: Sep. 14, 2021

(54) DISPLAY DEVICE AND DISPLAY SYSTEM

(71) Applicant: SAMSUNG ELECTRONICS CO., LTD., Suwon-si (KR)

(72) Inventors: Hyun Seok Kim, Suwon-si (KR); Jung-Hyuk Kim, Suwon-si (KR); Sang Hyup Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/760,303

(22) PCT Filed: Oct. 26, 2018

(86) PCT No.: PCT/KR2018/012792

§ 371 (c)(1),
(2) Date: Apr. 29, 2020

(87) PCT Pub. No.: WO2019/088584

PCT Pub. Date: May 9, 2019

(65) Prior Publication Data

US 2020/0264828 A1 Aug. 20, 2020

(30) Foreign Application Priority Data

Oct. 31, 2017 (KR) ........................ 10-2017-0143369

(51) Int. Cl.
*G06F 3/14* (2006.01)
*H04L 29/08* (2006.01)

(52) U.S. Cl.
CPC .......... *G06F 3/1454* (2013.01); *G06F 3/1446* (2013.01); *H04L 67/36* (2013.01)

(58) Field of Classification Search
CPC ..... G06F 3/1454; G06F 3/1446; H04L 67/36; G09G 2370/22; G09G 2330/08; G09G 2370/12; G09G 2300/026; G09G 3/20
See application file for complete search history.

(56) References Cited

U.S. PATENT DOCUMENTS 6,924,843 B1 * 8/2005 Yamazaki .......... H04N 21/4402 348/423.1
7,148,929 B1 * 12/2006 Mori ...................... G09G 5/003 348/553

(Continued)

FOREIGN PATENT DOCUMENTS

JP 2016-191771 A 11/2016
JP 2016191771 A * 11/2016

(Continued)

OTHER PUBLICATIONS

International Search Report (PCT/ISA/210) dated Feb. 21, 2019 issued by the International Searching Authority in International Application No. PCT/KR2018/012792.

*Primary Examiner* — David D Davis
(74) *Attorney, Agent, or Firm* — Sughrue Mion, PLLC

(57) ABSTRACT

Provided is a display device including: a display; a content receiver configured to receive image data from a first external device and output the image data received from the first external device to a second external device; and a controller configured to control the display an image corresponding to the received image data to be displayed. The controller controls the content receiver to receive image data from the second external device and output the image data received from the second external device to the first external device.

12 Claims, 17 Drawing Sheets

1

100 20 103 101 10 102 S 106 105 104 30 107 108 100a 100 100b P $P_R$ R G B $P_G$ $P_B$

(56) References Cited

U.S. PATENT DOCUMENTS 9,632,648 B2 * 4/2017 Lee .................... H04N 21/4126
2008/0244649 A1 * 10/2008 Ito ............................ H04N 5/85 725/38
2011/0058049 A1 * 3/2011 Grindstaff .......... H04N 5/23277 348/208.4
2013/0076681 A1 * 3/2013 Sirpal ................ H04N 21/4316 345/173
2013/0169765 A1 * 7/2013 Park ................. H04N 21/44218 348/54
2014/0009394 A1 * 1/2014 Lee ......................... G06F 3/038 345/157
2016/0085497 A1 * 3/2016 Kim ...................... G06F 3/1423 345/1.3
2017/0139664 A1 * 5/2017 Park ......................... G09G 3/20
2017/0286047 A1 * 10/2017 Patil ...................... G06F 3/0346

FOREIGN PATENT DOCUMENTS

KR 10-2010-0041607 A 4/2010
KR 10-2011-0058049 A 6/2011
KR 10-2017-0046989 A 5/2017
KR 10-2017-0055636 A 5/2017

* cited by examiner

DISPLAY DEVICE AND DISPLAY SYSTEM

TECHNICAL FIELD

The disclosures relates to a display system, and more specifically, to a display system including an image source device and a plurality of display devices.

BACKGROUND ART

In general, a display device is an output device that visually displays received or stored image information to a user, and is used in various fields, such as a home or business.

For example, a display device may include a monitor device connected to a personal computer (PC) or a server computer, a portable computer device, a navigation terminal device, a general television device, an Internet Protocol television (IPTV) device, a portable terminal device, such as a smart phone, a tablet PC, a personal digital assistant (PDA), or a cellular phone, various display devices used to reproduce images such as advertisements or movies in an industrial field, or other various types of audio/video systems.

Such a display device may display an image using various types of display panels. For example, the display device may include a light emitting diode (LED) panel, an organic light emitting diode (OLED) panel, a liquid crystal display (LCD) panel, and the like.

In addition, in order to implement a large display screen, a video wall may be combined. For example, the video wall may be arranged in a matrix form and may display a single image as a whole.

DISCLOSURE

Technical Problem

The present disclosure is directed to providing a display system including a plurality of display devices capable of displaying single image content as a whole.

The present disclosure is directed to providing a display system including a plurality of display devices that may continue displaying image content even when supply of the image content from an image source device is interrupted.

The present disclosure is directed to providing a display system including a plurality of display devices capable of receiving image content from a plurality of image source devices.

Technical Solution

One aspect of the present disclosure provides a display device including: a display; a content receiver configured to receive image data from a first external device and output the image data received from the first external device to a second external device; and a controller configured to control the display to display an image corresponding to the received image data, wherein the controller, in response to interruption of reception of the image data from the first external device, controls the content receiver to receive the image data from the second external device and output the image data received from the second external device to the first external device.

The controller, upon immediately detecting the interruption of reception of the image data from the first external device, may control the content receiver to receive the image data from the second external device and output the image data received from the first external device to the first external device.

The controller, upon detecting the interruption of reception of the image data from the first external device, may display a message indicating the interruption of the reception of the image data through at least one of the display and a sound outputter and may control the content receiver to receive the image data from the second external device and output the image data received from the first external device to the first external device according to a user input.

The content receiver may include: a first transmission/reception connector connected to the first external device; a second transmission/reception connector connected to the second external device; a splitter configured to split image data input through an input terminal of the splitter into a plurality of pieces of split image data, output one of the plurality of pieces of split image data to the controller, and output another one of the plurality of pieces of split image data through an output terminal of the splitter; and a switcher configured to connect the first transmission/reception connector to the input terminal of the splitter while connecting the second transmission/reception connector to the output terminal of the splitter or connect the first transmission/reception connector to the output terminal of the splitter while connecting the second transmission/reception connector to the input terminal of the splitter.

The controller may be configured to control the switcher to: transmit the image data received from the first transmission/reception connector to the splitter and output the other one of the plurality of pieces of image data split by the splitter to the second transmission/reception connector; and in response to interruption of the image data received from the first external device, transmit the image data received from the second transmission/reception connector to the splitter and output the other one of the plurality of pieces of split by the splitter to the first transmission/reception connector.

The switcher may connect the first transmission/reception connector to the input terminal of the splitter while connecting the second transmission/reception connection to the output terminal of the splitter in response to a first selection signal of the controller, and may connect the first transmission/reception connector to the output terminal of the splitter while connecting the second transmission/reception connector to the input terminal of the splitter in response to a second selection signal of the controller.

The switcher may include: a first switch provided between the first transmission/reception connector and the input terminal of the splitter; a second switch provided between the first transmission/reception connector and the output terminal of the splitter; a third switch provided between the second transmission/reception connector and the input terminal of the splitter; and a fourth switch provided between the second transmission/reception connector and the output terminal of the splitter, wherein the first and fourth switches may be closed in response to a first selection signal of the controller, and may be opened in response to a second selection signal of the controller, and the second and third switches may be opened in response to the first selection signal of the controller, and may be closed in response to the second selection signal of the controller.

Another aspect of the present disclosure provides a display system including: a first image source device and a second image source device configured to output image data; and a plurality of display devices connected in series between the first image source device and the second image source device, and configured to receive image data from the first image source device in a predetermined order, wherein the plurality of display devices receive the image data from the second image source device in an order reverse to the predetermined order in response to interruption of the reception of the image data from the first image source device.

The plurality of display devices may display an image corresponding to the image data received one of the first image source device and the second image source device as a whole.

The plurality of display devices, upon immediately detecting the interruption of the reception of the image data from the first image source device, may receive the image data from the second source device in the order reverse to the predetermined order.

The plurality of display devices, upon detecting the interruption of the reception of the image data from the first image source device, may display a message indicating the interruption of the reception of the image data and may receive the image data from the second image source device in the order reverse to the predetermined order according to a user input.

The plurality of display devices may include a first display device, a second display device, and at least one display device, wherein the first display device may be connected to the first image source device, the second display device may be connected to the second image source device, and the at least one display device may be connected to the first and second display devices.

The plurality of display devices may receive the image data in an order of the first image source device, the first display device, the at least one display device, and the second display device, and upon interruption of the reception of the image data from the first image source device, may receive the image data in an order of the second image source device, the second display device, the at least one display device, and the first display device.

Another aspect of the present disclosure provides a display system including: an image source device configured to output image data; first and second display devices connected to the image source device; and at least one display device connected between the first and second display devices. In a first mode, the first and second displays and the at least one display device receive image from the image source device in an order of the first display device, the at least one display device, and the second display device. In addition, in a second mode, the first and second displays and the at least one display device receive image from the image source device in an order of the second display device, the at least one display device, and the first display device.

The first and second display devices and the at least one display device may display an image corresponding to the image data received from the image source device as a whole.

The first and second display devices may be connected to the image source device via a communication network.

Advantageous Effects

According to one aspect of the disclosure, it is possible to provide a display system including a plurality of display devices capable of displaying one image content.

According to an aspect of the disclosure, it is possible to provide a display system including a plurality of display devices that may continue displaying image content even when supply of the image content from an image source device is interrupted.

According to an aspect of the disclosure, it is possible to provide a display system including a plurality of display devices capable of receiving image content from a plurality of image source devices.

MODES OF THE DISCLOSURE

Figure 1:
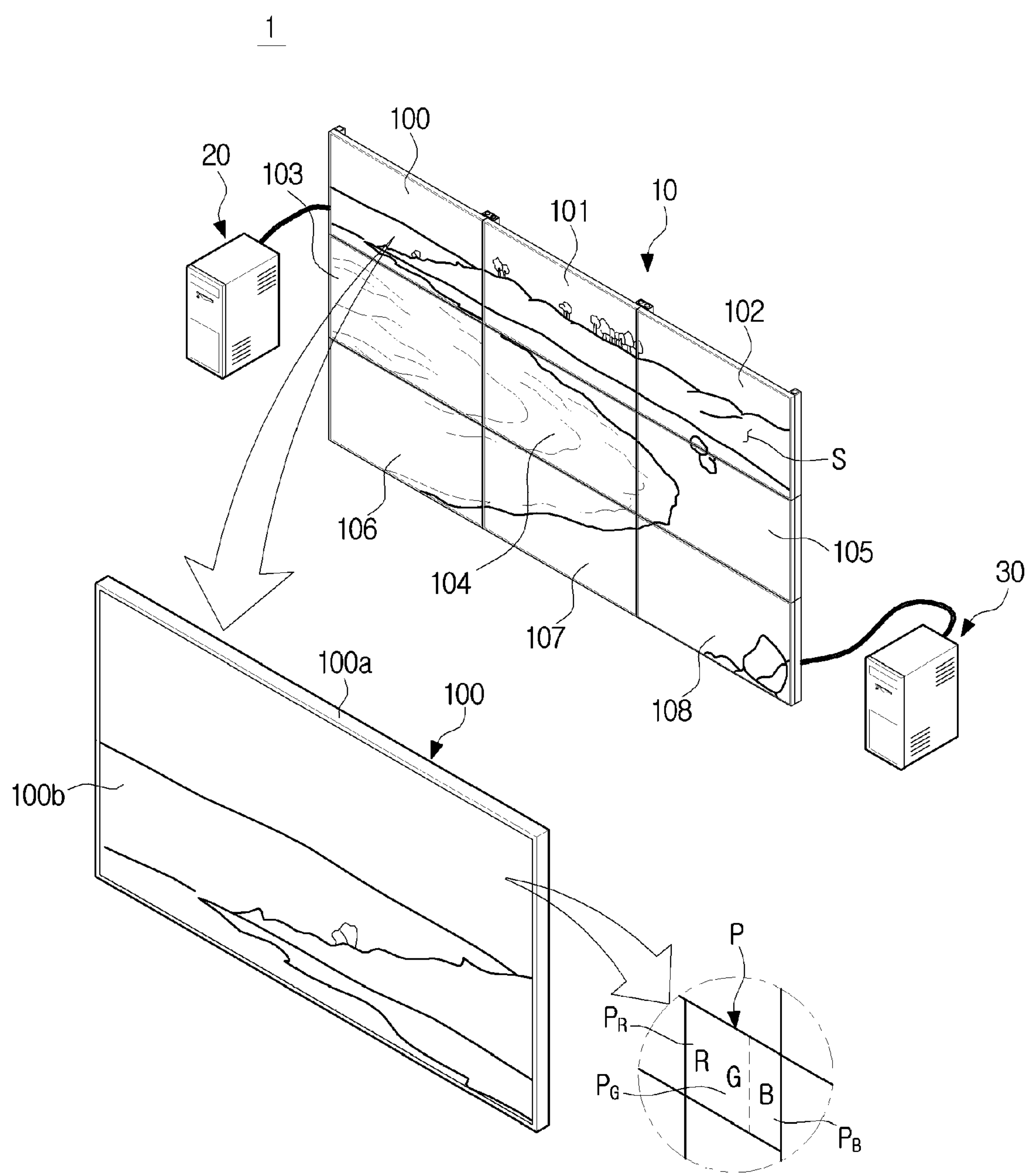
FIG. 1 illustrates a display system according to an embodiment.

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, In the specification, it will be understood that, when a member is referred to as being "on/under" another member, it may be directly on/under the other member, or one or more intervening members may also be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise. Hereinafter, the operating principles and embodiments of the disclosure will be described with reference to the accompanying drawings.

Hereinafter, the operating principles and embodiments of the disclosure will be described with reference to the accompanying drawings.

FIG. 1 illustrates a display system according to an embodiment.

Referring to FIG. 1, the display system 1 includes a video wall 10 for visually displaying an image and first and second image source devices 20 for providing image frame data to the video wall 10.

The first and second image source devices 20 and 30 may include a storage medium capable of storing content including video and audio, or receive content from an external content source (e.g., a video streaming service server). For example, the first and second image source devices 20 and 30 may store a file of content data on the storage medium or receive content data from an external content source.

The first and second image source devices 20 and 30 may decode content data to convert the content data stored in the storage medium or received from the external content source into image frame data. For example, the content data may be compressed by video compression standards, such as Moving Picture Experts Group (MPEG), High Efficiency Video Coding (HEVC), and the like, and the first and second image source devices 20 and 30 may restore image frame data each representing an image frame from the compressed content data.

In addition, the first and second image source devices 20 and 30 may transmit image frame data to the video wall 10. The first and second image source devices 20 and 30 may transmit image frame data to the video wall 10 through respective image data transmission lines.

The first image source device 20 and the second image source device 30 may output image frame data of the same image or image frame data of different images. When the first image source device 20 and the second image source device 30 output image frame data of the same image, the video wall 10 receives image frame data from the first image source device 20, and when the image source device 20 malfunctions (or stops operation), receives the image frame data from the second image source device 30. In addition, when the first image source device 20 and the second image source device 30 output image frame data of different images, the video wall 10 receives image frame data from the first image source device 20 and when the content of the first image source device 20 has ended, receives image frame data from the second image source device 30.

The video wall 10 may be a large display device (Large Format Display, LFD) installed outdoors, such as a roof of a building or a bus stop. Here, the outdoors are not limited to an open-air place, and may include a place where a large number of people enter or exist, even inside of a building, such as subway stations, shopping malls, cinemas, companies, shops, and the like, in which the video wall 10 according to the embodiment may be installed.

The video wall 10 may include a plurality of display devices 100 to 108 arranged in a row and a column as shown in FIG. 1. In other words, the plurality of display devices 100 to 108 may be arranged in a matrix form. For example, the plurality of display devices 100 to 108 may be arranged in a matrix form of 3 rows and 3 columns.

The video wall 10 including a plurality of display devices 100 to 108 may be form a single screen S as a whole. In other words, the video wall 10 may display one image as a whole.

The video wall 10 may display a part of the image displayed on the entire screen S. The video wall 10 may occupy a partial area of the screen S according to the arrangement, and may output different parts of the entire image according to the arrangement.

The video wall 10 may receive image frame data from the first and second image source devices 20 and 30 through the image data transmission lines, and display an image corresponding to the received image frame data.

The first and second image source devices 20 and 30 may transmit image frame data of the entire image to the video wall 10. The first and second image source devices 20 and 30 may transmit the image frame data to the video wall 10 in a parallel or in serial manner. In other words, the image frame data may be directly transmitted from the first and second image source devices 20 and 30 to the respective display devices 100 to 108, or may be transmitted from the first and second image source devices 20 and 30 sequentially to the plurality of display devices 100 to 108 through other display devices.

For example, the image frame data output from the first image source device 20 is received by the display device 100, and received via the display device 100 by the first display device 101, and then received via the first display device 101 by the second display device 102. In this way, the image frame data may be received by the third to eighth display devices 103 to 108 via the second to seventh display devices 102 to 107, respectively.

The display device 100 and the first to eighth display devices 101 to 108 may extract part of the image frame data of the entire image according to each position thereof, and display an image (a part of the entire image) corresponding to the extracted part of the image frame data.

For example, the display device 100 and the first to eighth display devices 101 to 108 each store a unique identification number according to the position thereof, and extract part of the image frame data of the entire image based on the identification number. The display device 100 located in the first column and the first row may store a unique identification number '11'. The display device 100 in the first column and the first row may divide the entire image into nine areas of three areas in the horizontal direction and three areas in the vertical direction and extract image frame data of the upper left area among the nine areas according to the unique identification number '11'. In addition, the display device 100 in the first column and the first row may display an image corresponding to the image frame data of the upper left area. In this way, each of the display device 100 and the first to eighth display devices 101 to 108 may display a part of the entire image, and the display device 100 and the first to eighth display devices 101 to 108 may display a single image integrated by a combination of images output by the display device 100 and the first to eighth display devices 101 to 108.

Each of the plurality of display devices 100 to 108 is a device that processes an image signal and visually displays the processed image. Each of the plurality of display devices 100 to 108 may be implemented in various forms such as a television (TV), a monitor, a portable multimedia device, a portable communication device, a portable computing device, and other devices without limitation as long as it can visually display an image.

Specifically, each of the plurality of display devices 100 to 108 receives a video signal and an audio signal (hereinafter, referred to as 'a video/audio signal') from various content sources, and outputs video and audio corresponding to the video/audio signal. For example, the display device 100 may receive television broadcast content through a broadcast reception antenna or a wired cable, receive content from a content playback device, or receive content from a content providing server of a content provider.

In addition, among the plurality of display devices 100 to 108, the display device 100 may include a main body 100*a* that accommodates a plurality of components for displaying an image and a screen 100*b* provided on one side of the main body 100*a* and displaying a part of an image I. The first to eighth display devices 101 to 108 may be implemented in the same form as the display device 100.

The main body 100*a* forms the external appearance of the display device 100, and accommodates components required for displaying the image I by the display device 100. The main body 100*a* shown in FIG. 1 is a flat plate shape, but the shape of the body 100*a* is not limited to that shown in FIG. 1. For example, the main body 100*a* may be provided in a curved shape such that right and left ends thereof protrude forward of the center and the center is bent in a concave shape.

The screen 100*b* is formed on a front surface of the main body 100*a*, and the image I, that is, visual image information may be displayed on the screen 100*b*. For example, a still image or a moving image (video) may be displayed on the screen 100*b*, and a 2D flat image or a 3D stereoscopic image may be displayed on the screen 100*b*.

A plurality of pixels P are formed in the screen 100*b*, and the image I displayed on the screen 100*b* may be formed by a combination of light emitted from the plurality of pixels P. For example, the light emitted by the plurality of pixels P may be combined as a mosaic to form a single image I on the screen 100*b*.

The respective pixels P may emit light of various brightness and various colors.

In order to emit light of various brightness, each of the plurality of pixels P includes a configuration that may emit light directly (for example, a light emitting diode or an organic light emitting diode) or a configuration that transmits or blocks light emitted by a backlight unit or the like (e.g., a backlight unit and a liquid crystal panel).

In order to emit light of various colors, each of the plurality of pixels P may include sub-pixels $P_R$, $P_G$, and $P_B$.

The sub-pixels $P_R$, $P_G$, and $P_B$ may include a red sub-pixel $P_R$ that may emit red light, a green sub-pixel $P_G$ that may emit green light, and a blue sub-pixel $P_B$ that may emit blue light. For example, red light may represent light in a wavelength range of approximately 620 nm (nanometer, 1 billionth of a meter) to 750 nm, green light may represent light in a wavelength range of approximately 495 nm to 570 nm, and blue light may represent light in a wavelength range of approximately 450 nm to 495 nm.

In combination of the red light of the red sub-pixel $P_R$, the green light of the green sub-pixel $P_G$ and the blue light of the blue sub-pixel $P_B$, each of the plurality of pixels P may emit light of various brightness and various colors.

The screen 100*b* shown in FIG. 1 is a flat plate shape, but the shape of the screen 100*b* is not limited to that shown in FIG. 1. For example, depending on the shape of the main body 100*a*, the screen 100*b* may be curved such that right and left ends protrude forward of the center.

The screen 100*b* may be implemented using a liquid crystal display panel (LCD panel), a light emitting diode panel (LED panel), or an organic light emitting diode panel (OLED panel), and other various types of display panels.

Figure 2:
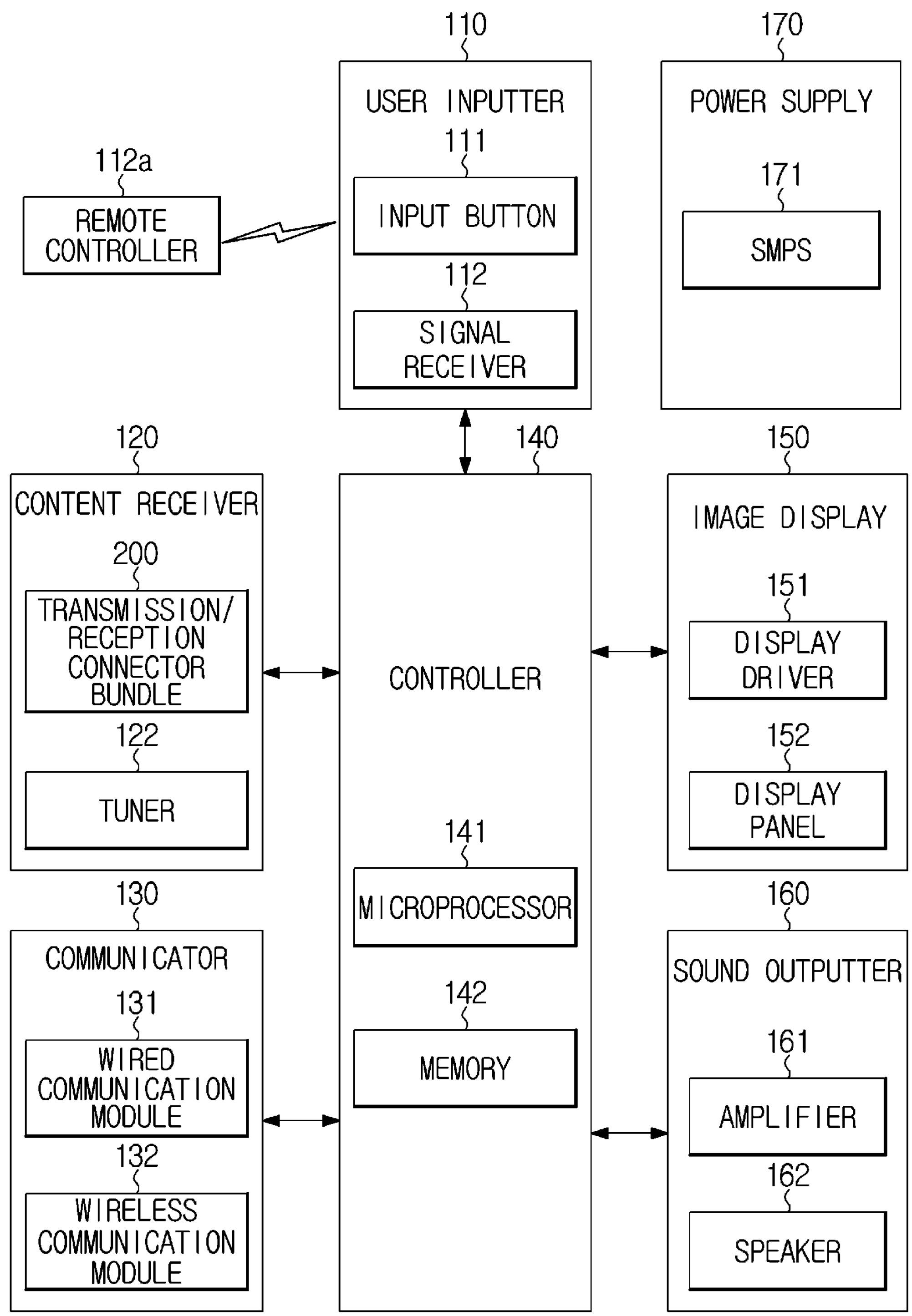
FIG. 2 illustrates a configuration of a display device according to an embodiment.
Figure 3:
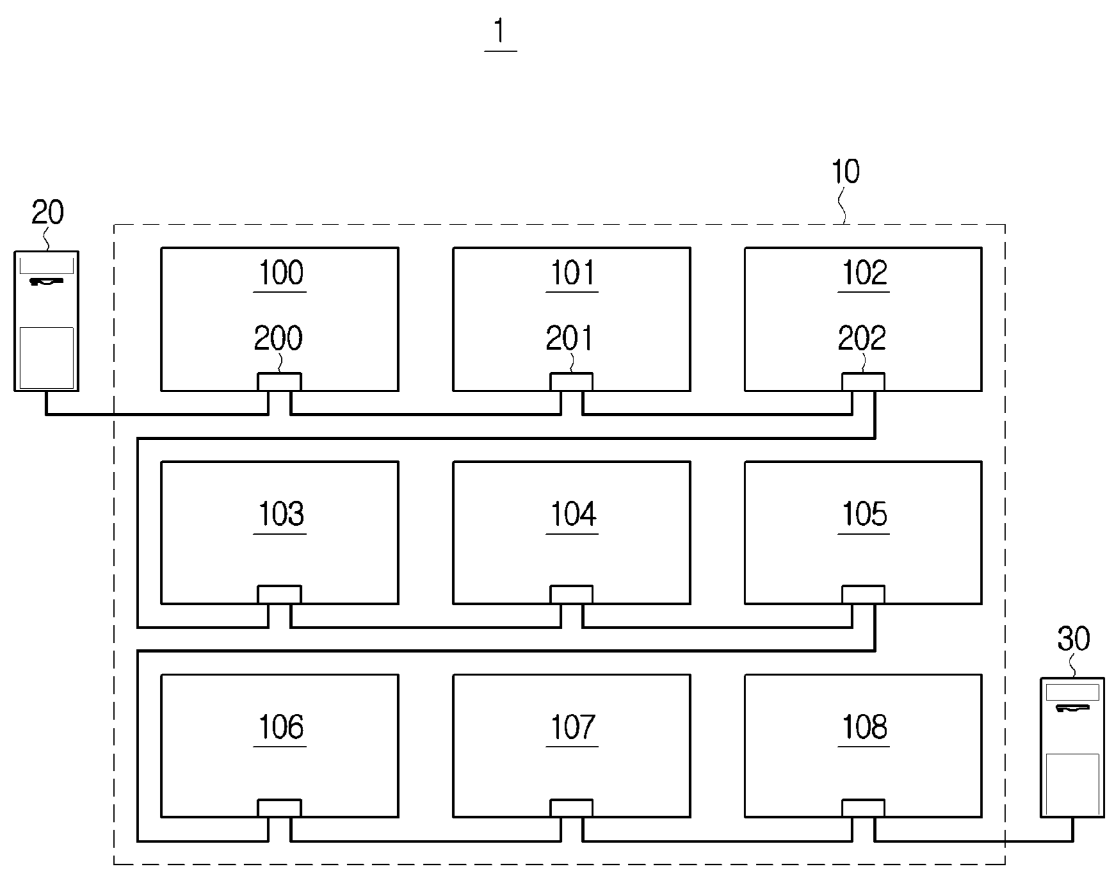
FIG. 3 illustrates a connection relationship between video walls according to an embodiment.
Figure 4:
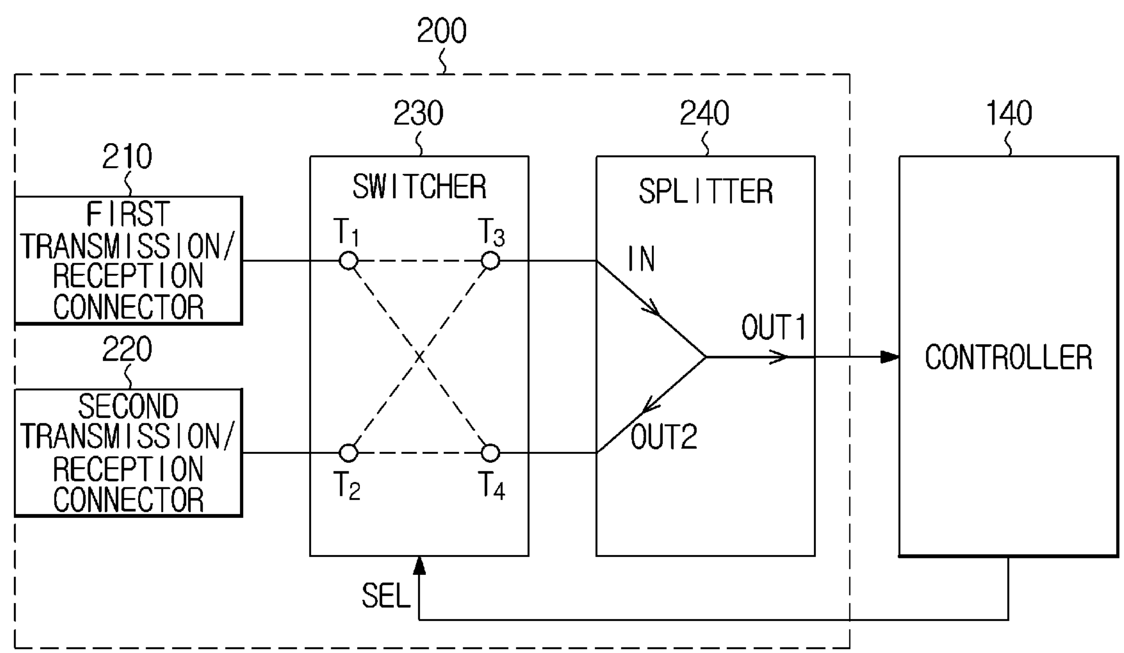
FIG. 4 illustrates a configuration of a transmission/reception connector bundle included in a display device according to an embodiment.
Figure 5:
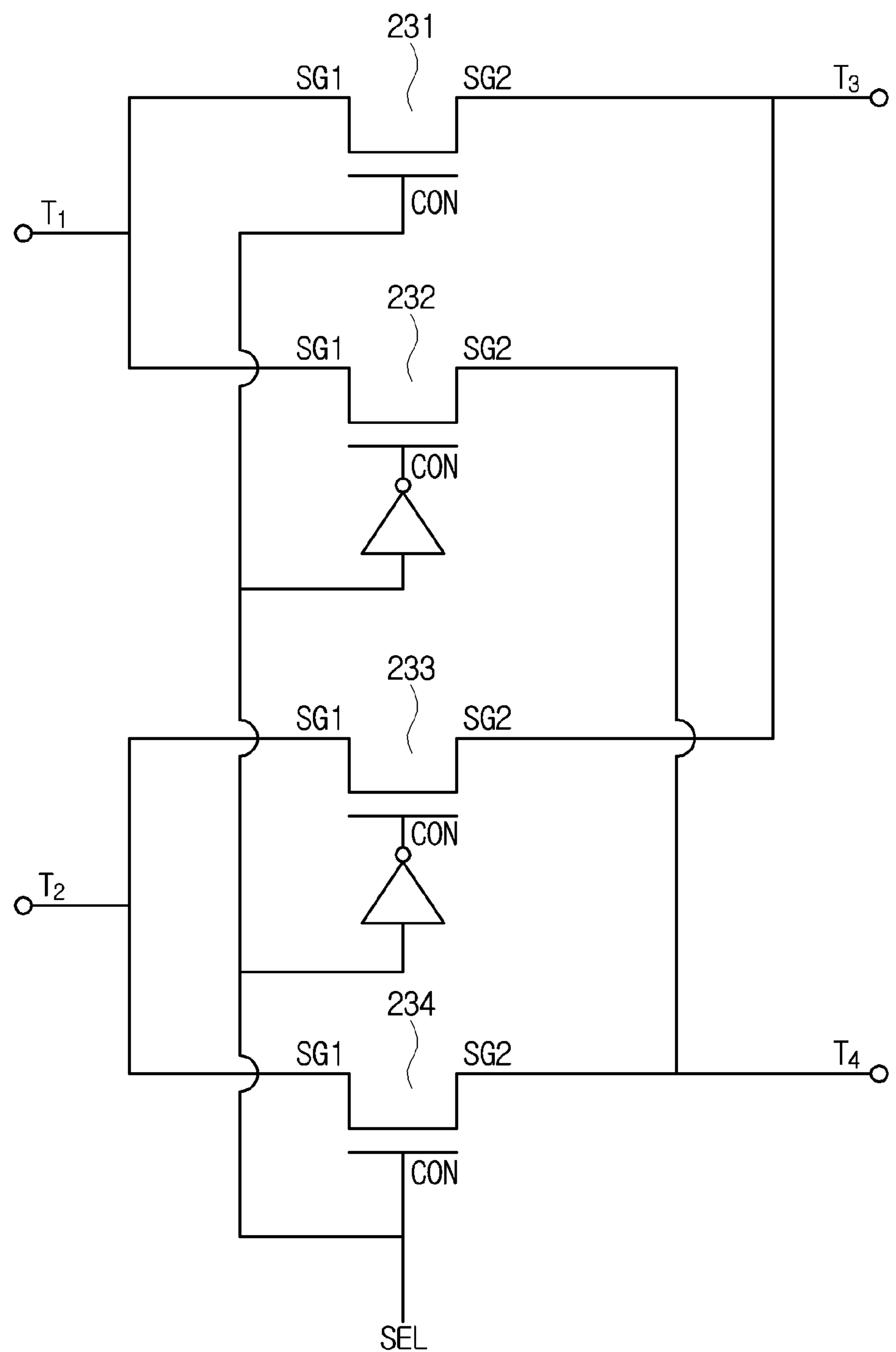
FIG. 5 illustrates a configuration of a switcher included in a display device according to an embodiment.

FIG. 2 illustrates a configuration of a display device according to an embodiment. FIG. 3 illustrates a connection relationship between video walls according to an embodiment. FIG. 4 illustrates a configuration of a transmission/reception connector bundle included in a display device according to an embodiment. FIG. 5 illustrates a configuration of a switcher included in a display device according to an embodiment.

In conjunction with FIGS. 2, 3, 4 and 5, the configuration and operations of the display device 100 of the video wall 10 is described, and it may be applied to other display devices 101 to 108 of the video wall 10.

The display device 100 includes a user inputter 110 receiving a user input from a user, and a content receiver 120 receiving video/audio signals from the first and second image source devices 20 and 30, a communicator 130 communicating with the first and second image source devices 20 and 30 and/or an external device, and a controller 140 controlling the operation of the display device 100 and processing the video/audio signal received from the content receiver 120 and/or the communicator 130, an image display 150 displaying an image processed by the controller 140, a sound outputter 160 outputting sound processed by the controller 140, and a power supply 170 supplying power to the components of the display device 100.

The user inputter 110 may include an input button group 111 that receives a user input. For example, the user inputter 110 may include a power button for turning on or off the display device 100, a channel selection button for selecting broadcast content displayed on the display device 100, a sound control button for adjusting the volume of the sound output by the display device 100, and a source selection button for selecting a content source.

The input button group 111 may receive a user input and output an electrical signal corresponding to the user input to the controller 140, and may be implemented by various input devices, such as a push switch, a touch switch, a dial, a slide switch, and a toggle switch.

The user inputter 110 also includes a signal receiver 112 that receives a remote control signal of a remote controller 112*a*. The remote controller 112*a* receiving a user input may be provided separately from the display device 100, and configured to receive a user input and transmit a wireless signal corresponding to the user input to the display device 100. The signal receiver 112 may receive a wireless signal corresponding to a user input from the remote controller 112*a*, and output an electrical signal corresponding to the user input to the controller 140.

The content receiver 120 may include a transmission/reception connector bundle 200 that receives and transmits image frame data from and to the first and second image source devices 20 and 30 and/or other display devices 101 to 108, and a tuner 122 for tuning a broadcast signal.

The display device 100 may be connected to the first and second image source devices 20 and 30 and/or other display devices 101 to 108 through the transmission/reception connector bundle 200. For example, as illustrated in FIG. 3, the display device 100 may be connected to the first image source device 20 and the first display device 101 through the transmission/reception connector bundle 200. The first display device 101 may be connected to the display device 100 and the second display device 102 through a first transmission/reception connector group 201, and the second display device 102 may be connected to the first and third display devices 101 and 103 through a second transmission/reception connector group 202. In this way, the third display device 103 may be connected to the second and fourth display devices 102 and 104, and the fourth display device 104 may be connected to the third and fifth display devices 103 and 105, and the fifth display device 105 may be connected to the fourth and sixth display devices 104 and 106, and the sixth display device 106 may be connected to the fifth and seventh display devices 105 and 107, and the seventh display device 107 may be connected to the sixth and eighth display devices 106 and 108. Also, the eighth display device 108 may be connected to the seventh display device 107 and the second image source device 30.

The display device 100 receives image frame data from the first and second image source devices 20 and 30 and/or other display devices 101 to 108 through the transmission/reception connector bundle 200, and transmits the image frame data to the other display devices 101 to 108 through the transmission/reception connector bundle 200.

For example, the display device 100 may receive image frame data from the first image source device 20 through the transmission/reception connector bundle 200. The first display device 101 may receive the image frame data of the first image source device 20 from the display device 100 through the first transmission/reception connector group 201, and the second display device 101 may receive the image frame data of the first image source device 20 from the first display device 101 through the second transmission/reception connector group 202. In this way, the third display device 103 receives the image frame data from the second display device 102, and the fourth display device 104 receives the image frame data from the third display device 103, and the fifth display device 105 receives the image frame data from the fourth display device 104, and the sixth display device 106 receives the image frame data from the fifth display device 105, and the seventh display device 107 receives the image frame data from the sixth display device 106, and the eighth display device 108 may receive the image frame data from the seventh display device 107.

As another example, the eighth display device 108 receives image frame data from the second image source device 30, and the seventh display device 107 receives the image frame data from the eighth display device 108, the sixth display device 106 receives the image frame data from the seventh display device 107, and the fifth display device 105 receives the image frame data from the sixth display device 106, the fourth display device 104 receives the image frame data from the fifth display device 105, the third display device 103 receives the image frame data from the fourth display device 104, the second display device 102 receives the image frame data from the third display device 103, the first display device 101 receives the image frame data from the second display device 102, and the display device 100 receives the image frame data from the first display device 101.

The transmission/reception connector bundle 200 may include a component (component, YPbPr/RGB) terminal, a composite (composite video blanking and sync, CVBS) terminal, an audio terminal, a high definition multimedia interface (HDMI) terminal, a digital visual interface (digital visual interface, DVI) terminal, a video graphics array (VGA) terminal, a universal serial bus (USB) terminal, and the like.

For example, as shown in FIG. 4, the transmission/reception connector bundle 200 includes the first transmission/reception connector 210, the second transmission/reception connector 220, a switcher 230, and a splitter 240.

The first and second transmission/reception connectors 210 and 220 may be each connected to one of the different display devices 101 to 108 through an image transmission cable, or may be each connected to one of the first and second image source devices 20 and 30. For example, the first transmission/reception connector 210 of the display device 100 may be connected to the first image source device 20, and the second transmission/reception connector 220 may be connected to the first display device 101.

In addition, the first and second transmission/reception connectors 210 and 220 may provide data paths through which image frame data is transmitted to and received from the respective display devices 101 to 108 and/or the first and second image source devices 20 and 30. For example, the display device 100 may receive image frame data from the first image source device 20 through the first transmission/reception connector 210 and output the image frame data to the first display device 101 through the second transmission/reception connector 220, or may receive image frame data from the first image source device 20 through the second transmission/reception connector 220 and transmit the image frame data to the first image source device 20 through the first transmission/reception connector 210.

Each of the first and second transmission/reception connectors 210 and 220 may include a plurality of pins. For example, the first and second transmission/reception connectors 210 and 220 may each include a component (YPbPr) terminal, and three pins. The first and second transmission/reception connectors 210 and 220 may each include a composite (CVBS) terminal, and one pin. The first and second transmission/reception connectors 210 and 220 may each include a HDMI terminal, and nineteen pins. The first and second transmission/reception connectors 210 and 220 may each include a DVI terminal, and twenty four pins. The first and second transmission/reception connectors 210 and 220 may each include a VGA terminal, and fifteen pins.

The switcher 230 may transmit image frame data received through the first transmission/reception connector 210 to the splitter 240 or may transmit image frame data received through the second transmission/reception connector 220 to the splitter 240 according to a control signal of the controller 140.

The switcher 230 may include a first terminal T1 connected to the first transmission/reception connector 210, a second terminal T2 connected to the second transmission/reception connector 220, and third and fourth terminals T3 and T4 connected to the splitter 240, and a selection terminal SEL connected to the controller 140.

The switcher 230 may connect the first terminal T1 to the third terminal T3 or may connect the first terminal T1 to the fourth terminal T4 according to a control signal of the controller 140 received through the selection terminal SEL.

In addition, the switcher 230 may connect the second terminal T2 to the fourth terminal T4 or may connect the second terminal T2 to the third terminal T3 according to a control signal of the controller 140 received through the selection terminal SEL. For example, when a first selection signal is received from the controller 140 through the selection terminal SEL, the switcher 230 connects the first terminal T1 to the third terminal T3 and connects the second terminal T2 to the fourth terminal T4. In addition, when a second selection signal is received from the controller 140 through the selection terminal SEL, the switcher 230 may connect the first terminal T1 to the fourth terminal T4 and connect the second terminal T2 to the third terminal T3.

The switcher 230 shown in FIG. 5 includes a first switch 231, a second switch 232, a third switch 233, a fourth switch 234, a first inverter 235, and a second inverter 236.

The switches 231, 232, 233, and 234 may each include first and second signal terminals SG1 and SG2 forming a signal path for transmitting electrical signals, and a control terminal CON allowing or blocking the signal path between the first and second signal terminals SG1 and SG2.

The first switch 231 is provided between the first terminal T1 and the third terminal T3 and allows or blocks a signal transmission between the first terminal T1 and the third terminal T3 according to a control signal of the controller 140 received through the selection terminal SEL. Specifically, the first signal terminal SG1 of the first switch 231 is connected to the first terminal T1, the second signal terminal SG2 of the first switch 231 is connected to the third terminal T3, and the control terminal CON of the first switch 231 is connected to the selection terminal SEL.

The second switch 232 is provided between the first terminal T1 and the fourth terminal T4, and may allow or block a signal transmission between the first terminal T1 and the fourth terminal T4 according to a control signal of the controller 140 received through the selection terminal SEL. Specifically, the first signal terminal SG1 of the second switch 232 is connected to the first terminal T1, the second signal terminal SG2 of the second switch 232 is connected to the fourth terminal T4, and the control terminal CON of the second switch 232 is connected to the selection terminal SEL through the first inverter 235.

Here, the first inverter 235 may convert a control signal of the controller 140 received through the selection terminal (SEL) into an opposite signal. For example, when the first selection signal is received from the controller 140 through the selection terminal SEL, the first inverter 235 outputs the second selection signal, and when the second selection signal is received from the controller 140 through the selection terminal SEL, the first inverter 235 may output the first selection signal.

The third switch 233 is provided between the second terminal T1 and the third terminal T3, and allows or blocks a signal transmission between the second terminal T2 and the third terminal T3 according to a control signal of the controller 140 received through the selection terminal SEL. Specifically, the first signal terminal SG1 of the third switch 233 is connected to the second terminal T2, the second signal terminal SG2 of the third switch 233 is connected to the third terminal T3, and the control terminal CON of the third switch 233 is connected to the selection terminal SEL through the second inverter 236.

Here, the second inverter 236 may convert a control signal of the controller 140 received through the selection terminal SEL into an opposite signal. For example, when the first selection signal is received from the controller 140 through the selection terminal SEL, the second inverter 236 outputs the second selection signal, and when the second selection signal is received from the controller 140 through the selection terminal SEL, outputs the first selection signal.

The fourth switch 234 is provided between the second terminal T2 and the fourth terminal T4, and according to a control signal of the controller 140 received through the selection terminal SEL, allows or blocks a signal transmission between the second terminal T2 and the fourth terminal T4. Specifically, the first signal terminal SG1 of the fourth switch 234 is connected to the second terminal T2, the second signal terminal SG2 of the fourth switch 234 is connected to the fourth terminal T4, and the control terminal CON of the fourth switch 234 is connected to the selection terminal SEL.

The switches 231, 232, 233, and 234 may be provided using transistors that open and close the signal paths by respective electrical signals. For example, the switches 231, 232, 233, and 234 may employ a metal-oxide-semiconductor field effect transistor (MOSFET) (hereinafter referred to as a 'MOSFET').

All of the switches 231, 232, 233, and 234 may be provided using the same type of MOSFET. For example, all of the switches 231, 232, 233, and 234 may be provided using an N-channel MOSFET, or using a P-channel MOSFET.

In addition, the switches 231, 232, 233, and 234 may using different types of MOSFET to omit the inverters 235 and 236. For example, the first and fourth switches 231 and 234 may be provided using an N-channel MOSFET, and the second and third switches 232 and 233 may be provided using a P-channel MOSFET, and the inverters 235 and 236 may be omitted. In addition, the first and fourth switches 231 and 234 may be provided using a P-channel MOSFET, and the second and third switches 232 and 233 may be provided using an N-channel MOSFET, and the inverters 235 and 236 may be omitted.

The switcher 230 may include a plurality of the first terminals T1, a plurality of the second terminals T2, a plurality of the third terminals T3, and a plurality of the fourth terminals T4 according to the type of the first and second transmission/reception connectors 210 and 220. Further, the switcher 230 may include a plurality of the first switches 231, a plurality of the second switches 232, a plurality of the third switches 233, a plurality of the fourth switches 234, a plurality of the first inverters 235, and a plurality of the second inverters 236 according to the types of the first and second transmission/reception connectors 210 and 220.

For example, the first and second transmission/reception connectors 210 and 220 may each include a HDMI terminal, and the switcher 230 may include nineteen first terminals T1, nineteen second terminals T2, nineteen third terminals T3, and nineteen fourth terminals T4, and the switcher 230 may also include nineteen first switches 231, nineteen second switches 232, nineteen third switches 233, nineteen fourth switches 234, nineteen first inverters 235, and nineteen second inverters 236.

In response to the first selection signal of the controller 140, the nineteen first terminals T1 are connected to the nineteen third terminals T3, respectively, and the nineteen second terminals T2 are connected to the nineteen fourth terminals T4, respectively. In addition, in response to the second selection signal of the controller 140, the nineteen first terminals T1 are connected to the nineteen fourth terminals T4, respectively, and the nineteen second terminals T2 are connected to the nineteen third terminals T3, respectively.

The splitter 240 may receive a signal, split (or copy) the received signal into two identical signals, and output the two split (or copied) signals. Specifically, the splitter 240 receives image frame data from the switcher 230, splits (or copies) the image frame data into two pieces of image frame data, and outputs the two pieces of image frame data to the controller 130 and the switcher 230, respectively.

The splitter 240 includes a first input terminal IN1 connected to the third terminal T3 of the switcher 230, a first output terminal OUT1 connected to the controller 140, and a second output terminal OUT2 connected to the fourth terminal T4 of the switcher 230. The splitter 240 splits (or copies) image frame data received through the first input terminal IN1 into two pieces of identical image frame data, and outputs one of the two pieces of image frame data to the controller 140 through the first output terminal OUT1 and outputs the other one of the two pieces of image frame data to the switcher 230 through the second output terminal OUT2.

The image frame data output to the controller 140 through the first output terminal OUT1 may be processed by the controller 140, and a part of an image corresponding to the image frame data is displayed on the display device 100.

The image frame data output to the switcher 230 through the second output terminal OUT2 may be output to the first display device 101 through the second transmission/reception connector 220, or may be output to the first image source device 20 through the first transmission/reception connector 210.

The splitter 240 may include a plurality of the first input terminals IN1, a plurality of the first output terminals OUT1, and a plurality of the second output terminals OUT2 according to the types of the first and second transmission/reception connectors 210 and 220. For example, the first and second transmission/reception connectors 210 and 220 may each include a HDMI terminal, and the splitter 240 may include nineteen first input terminals IN1, nineteen first output terminal OUT1, and nineteen second output terminals OUT2.

In addition, the splitter 240 splits (or copies) each of nineteen pieces of data received through the nineteen first input terminals IN1 and outputs one pieces of split data of the nineteen pieces of data to the controller 140 through the first output terminal OUT1, and outputs the other pieces of split data of the nineteen pieces of data to the switcher 230 through the second output terminal OUT2.

As such, the display device 100 may be connected to the first and second image source devices 20 and 30 and the first to eighth display devices 101 to 108 through the transmission/reception connector bundle 200.

In particular, in response to the first selection signal of the controller 140, image frame data is received from the first image source device 20 through the first transmission/reception connector 210, and is transmitted through the switcher 230 to the splitter 240. The image frame data is split (or copied) into two pieces of identical image frame data by the splitter 240, and one of the two pieces of image frame data is processed by the controller 140, and the other one of the two piece of image frame data is output to the first display device 101 via the switcher 230 and the second transmission/reception connector 220.

In addition, in response to the second selection signal of the controller 140, image frame data is received from the first display device 101 through the second transmission/reception connector 220. In this case, the image frame data may be generated by the second image source device 30 and input to the display device 100 sequentially through the eighth to first display devices 108 to 101. The image frame data may be transmitted to the splitter 240 by the switcher 230. The image frame data is split (or copied) into two pieces of identical image frame data by the splitter 240, and one of the two pieces of image frame data is processed by the controller 140, and the other one of the two pieces of image frame data is output to the first image source device 20 through the switcher 230 and the first transmission/reception connector 210.

As a result, the display device 100 displays a part of an image corresponding to the image frame data of the first image source device 20 in response to the first selection signal of the controller 140, and displays a part of an image corresponding to the image frame data of the second image source device 30 in response to the second selection signal of the controller. The same applies to the other display devices 101 to 108.

Referring again to FIG. 2, the tuner 122 may receive broadcast signals from a broadcast reception antenna or a wired cable and extract a broadcast signal of a channel selected by a user from the broadcast signals. For example, the tuner 142 may pass a broadcast signal having a frequency corresponding to a channel selected by a user among a plurality of broadcast signals received through a broadcast reception antenna or a wired cable, and block broadcast signals having other frequencies.

As such, the content receiver 120 may receive the image frame data and/or video/audio signals through the transmission/reception connector bundle 200 and/or the tuner 122, and output the image frame data and/or video/audio signals received through the transmission/reception connector bundle 200 and/or the tuner 122 to the controller 140.

The communicator 130 may communicate with the first and second image source devices 20 and 30 and/or external devices. In particular, the communicator 130 may receive video/audio signals from the first and second image source devices 20 and 30.

The communicator 130 may include a wired communication module 131 and a wireless communication module 132 that may exchange data with the first and second image source devices 20 and 30 and/or the external devices.

The wired communication module 131 may access a communication network through a cable and exchange data with the first and second image source devices 20 and 30 and/or the external devices through the communication network. For example, the wired communication module 131 may access the communication network through Ethernet (IEEE 802.3 technical standard), and exchange data with the first and second image source devices 20 and 30 and/or the external devices through the communication network.

The wireless communication module 132 may wirelessly communicate with an access point (AP), access a communication network through the AP, and exchange data with the first and second image source devices 20 and 30 and/or the external devices through the communication network. For example, the wireless communication module 132 may communicate with the AP via Wi-Fi (WiFi™, IEEE 802.11 technology standard), Bluetooth (Bluetooth™, IEEE 802.15.1 technology standard), or Zigbee (ZigBee™, IEEE 802.15.4 technology standard), and exchange data with the first and second image source devices 20 and 30 and/or the external devices through the AP.

The communicator 130 may receive image frame data from the first and second image source devices 20 and 30 through the communication network.

The controller 140 may process the image frame data and/or video/audio signals received by the content receiver 120 and/or the communicator 130. For example, the controller 140 may output the image frame data received from the content receiver 120 to the image display 150. In addition, the controller 140 processes the video/audio signals received from the content receiver 120 and/or the communicator 130, and outputs image frame data generated from the video/audio signals to the image display 150.

The controller 140 may control the operation of the content receiver 120, the image display 150, and the sound outputter 160 according to the operation state of the display device 100 and/or user input. For example, when a content source is selected by a user input, the controller 140 may control the content receiver 120 to receive image frame data from the selected content source. In addition, when image frame data is not received through the content receiver 120, the controller 140 may control the content receiver 120 to receive image frame data from another content source.

In particular, the controller 140 may output a selection signal to select a source for receiving image frame data to the transmission/reception connector bundle 200 of the content receiver 120. For example, the controller 140 may output a first selection signal for receiving image frame data from the first image source device 20 to the transmission/reception connector bundle 200, or may output a second selection signal for receiving image frame data from the second image source device 30 through the first to eighth display devices 101 to 108 to the transmission/reception connector bundle 200. In response to the first selection signal, the transmission/reception connector bundle 200 receives image frame data from the first image source device 20, and outputs the received image frame data to the controller 140 and the first display device 101. In addition, in response to the second selection signal, the transmission/reception connector bundle 200 receives image frame data from the second image source device 30 through the first to eighth display devices 101 to 108, and outputs the received image frame data to the to the controller 140 and the first image source device 20.

The controller 140 may include a microprocessor 141 and a memory 142.

The memory 142 stores program and data for processing image frame data and/or video/audio signals, and temporarily stores data generated during processing of the image frame data and/or video/audio signals. In addition, the memory 142 may store programs and data for controlling the components included in the display device 100, and temporarily store data generated during control of the components included in the display device 100.

The memory 142 may include a non-volatile memory, such as a read only memory (ROM) and a flash memory, for storing data for a long time, and a volatile memory, such as a static random access memory (S-RAM) and a Dynamic Random Access Memory (D-RAM) for temporarily storing data.

The microprocessor 141 may receive image frame data and/or video/audio signals from the content receiver 120 and/or the communicator 130. The microprocessor 141 may output the image frame data received from the content receiver 120 to the image display 150 and the sound outputter 160. In addition, the microprocessor 141 may generate image frame data and sound data by decoding a video signal and an audio signal, and output the image frame data and the sound data to the image display 150 and the sound outputter 160, respectively.

The microprocessor 141 receives a user input from the user inputter 110 and generates a control signal for controlling the content receiver 120 and/or the image display 150 and/or the sound outputter 160 according to the user input. In addition, the microprocessor 141 may generate a control signal for controlling the operation of the content receiver 120 according to whether image frame data is received through the content receiver 120.

The microprocessor 141 may include an operation circuit that performs logical operations and arithmetic operations, and a memory circuit that stores the calculated data.

The image display 150 includes a display panel 152 for visually displaying an image and a display driver 151 for driving the display panel 152.

The display panel 152 may generate an image according to image data received from the display driver 151 and display the image.

The display panel 152 may include a pixel that is a unit for displaying an image. Each pixel may receive an electrical signal for representing an image from the display driver 151 and output an optical signal corresponding to the received electrical signal. As the optical signals output from a plurality of pixels are combined, one image may be displayed on the display panel 152.

The display driver 151 may receive image data from the controller 140 and drive the display panel 152 to display an image corresponding to the received image data. Specifically, the display driver 151 may transmit an electrical signal corresponding to image data to each of a plurality of pixels constituting the display panel 152.

When the display driver 151 transmits an electrical signal corresponding to image data to each pixel constituting the display panel 152, each pixel outputs light corresponding to the received electrical signal, and light output by the respective pixels are combined to form a single image.

The sound outputter 160 includes an amplifier 161 for amplifying sound, and a speaker 162 for acoustically outputting the amplified sound.

The controller 140 may convert sound data decoded from an audio signal into an analog sound signal, and the amplifier 161 may amplify the analog sound signal output from the controller 140.

The speaker 162 may convert the analog sound signal amplified by the amplifier 181 into sound (sound wave). For example, the speaker 182 may include a thin film that vibrates according to an electrical acoustic signal, and sound waves may be generated by the vibration of the thin film.

The power supply 170 may supply power to the user inputter 110, the content receiver 120, the communicator 130, the controller 140, the image display 150, the sound outputter 160, and all other components.

The power supply 170 includes a switching mode power supply 171 (hereinafter, referred to as 'SMPS').

The SMPS 171 may include an AC-DC converter that converts AC power of an external power source into DC power, and a DC-DC converter that changes the voltage of the DC power. For example, AC power of the external power source is converted to DC power by the AC-DC converter, and the voltage of the DC power is changed to various voltages (for example, 5V and/or 15V) by the DC-DC converter. The DC power of which the voltage is changed may be supplied to the user inputter 110, the content receiver 120, the controller 140, the image display 150, the sound outputter 160, and all other components.

As described above, the display device 100 may be connected to the first and second image source devices 20 and 30 and the first to eighth display devices 101 to 108 through the transmission/reception connector bundle 200.

In addition, the transmission/reception connector bundle 200 may include the switcher 230 for selecting a source of image frame data, and the switcher 230 may receive image frame data output from the first image device 20 or image frame data output from the second image source device 30 according to a selection signal of the controller 140. As a result, the display device 100 may receive image frame data output from the first image source device 20 or image frame data output from the second image source device 20.

Each of the first to eighth display devices 101 to 108 may have the same configuration and operation as those of the display device 100. Specifically, the first to eighth display devices 101 to 108 may each receive image frame data output from the first image source device 20 or image frame data output from the second image source device 20.

In the above description, the display device 100 has been illustrated as being connected to the first and second image source devices 20 and 30 and the first to eighth display devices 101 to 108 through the content receiver 120, but the disclosure is not limited thereto. For example, the display device 100 may be connected to the first and second image source devices 20 and 30 and the first to eighth display devices 101 to 108 through the communicator 130. In addition, the communicator 130 may include a switcher and a splitter for selectively receiving image frame data output from the first image source device 20 or image frame data output from the second image source device 30.

Figure 6:
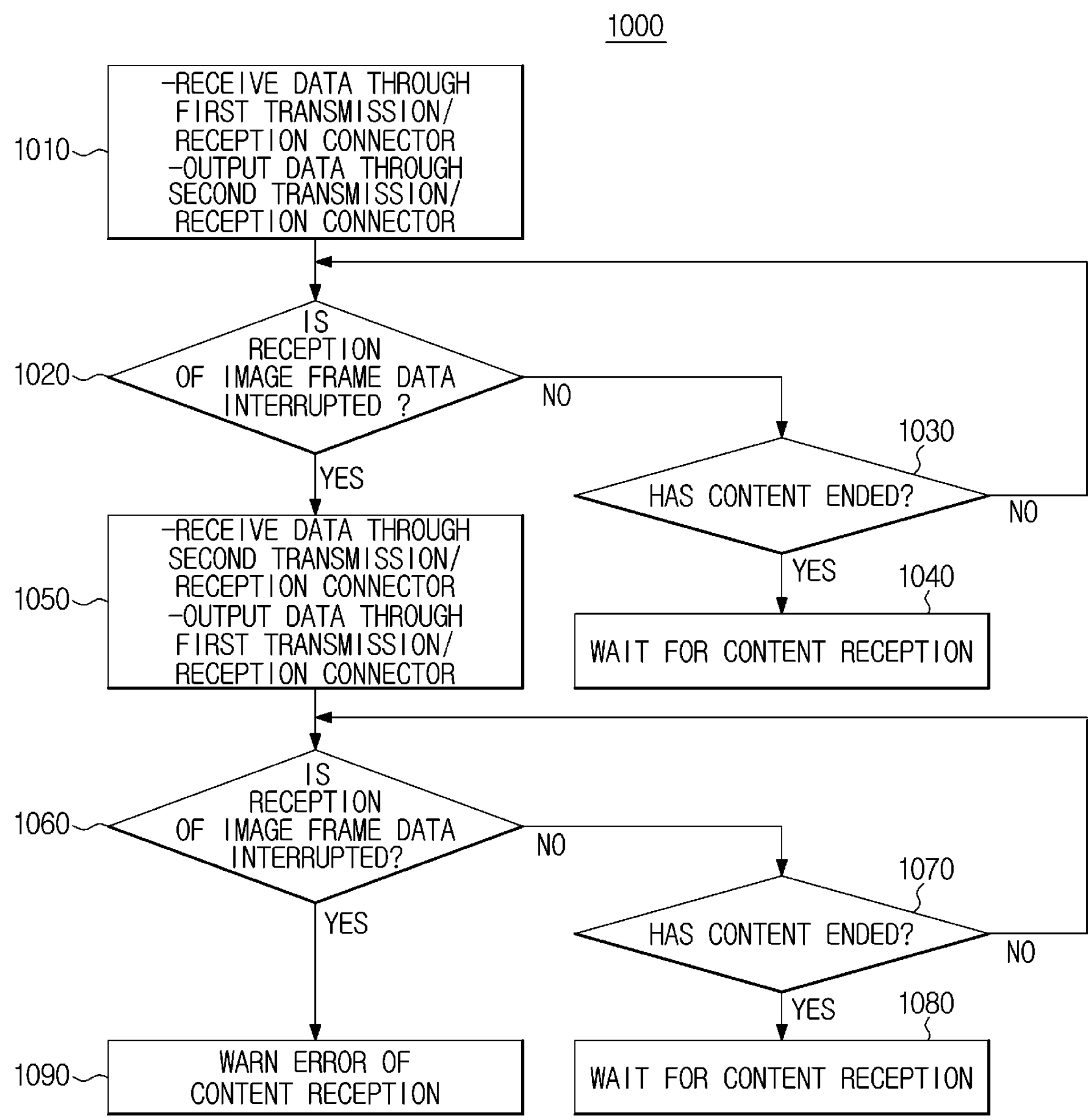
FIG. 6 illustrates an example of an image source selection operation of a display device according to an embodiment.
Figure 7:
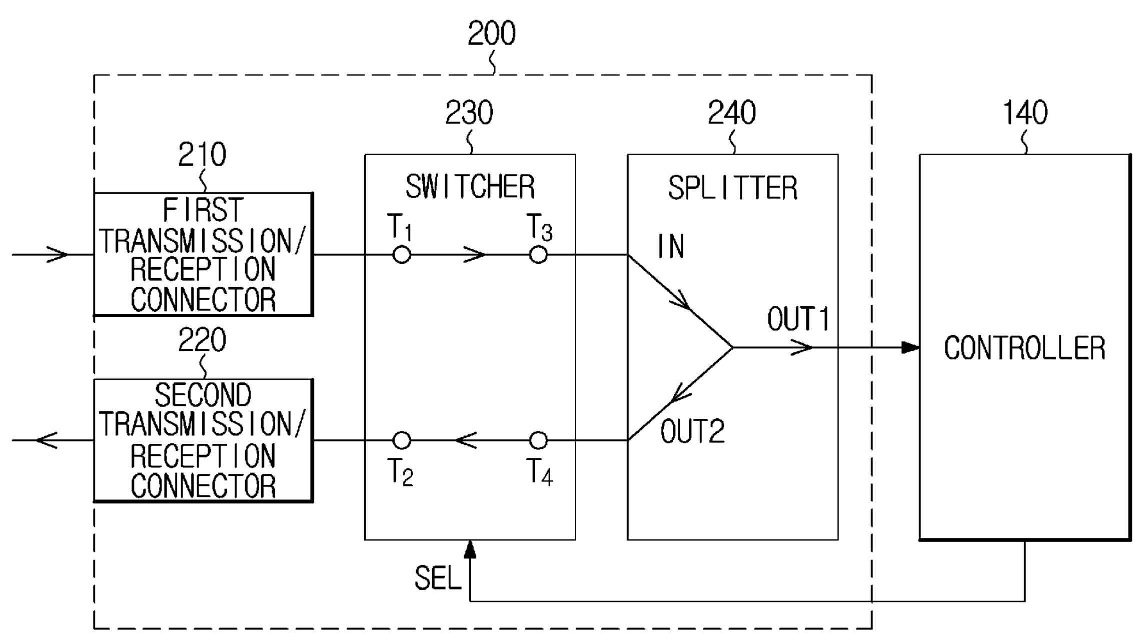
FIG. 7 illustrates an example of an operation of a transmission/reception connector bundle by the image source selection operation shown in FIG. 6.
Figure 8:
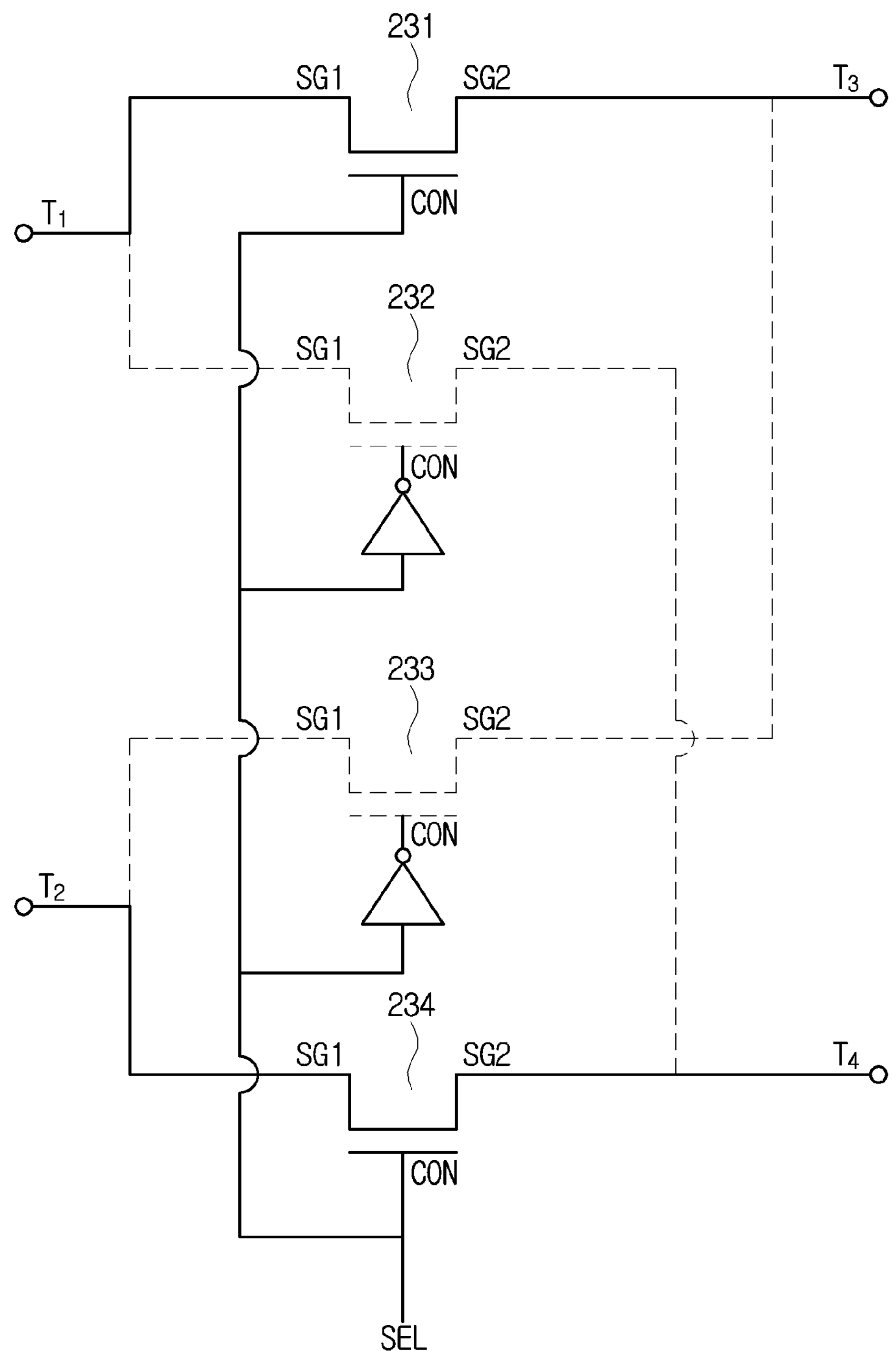
FIG. 8 illustrates an operation of a switcher according to the operation of the transmission/reception connector bundle shown in FIG. 7.
Figure 9:
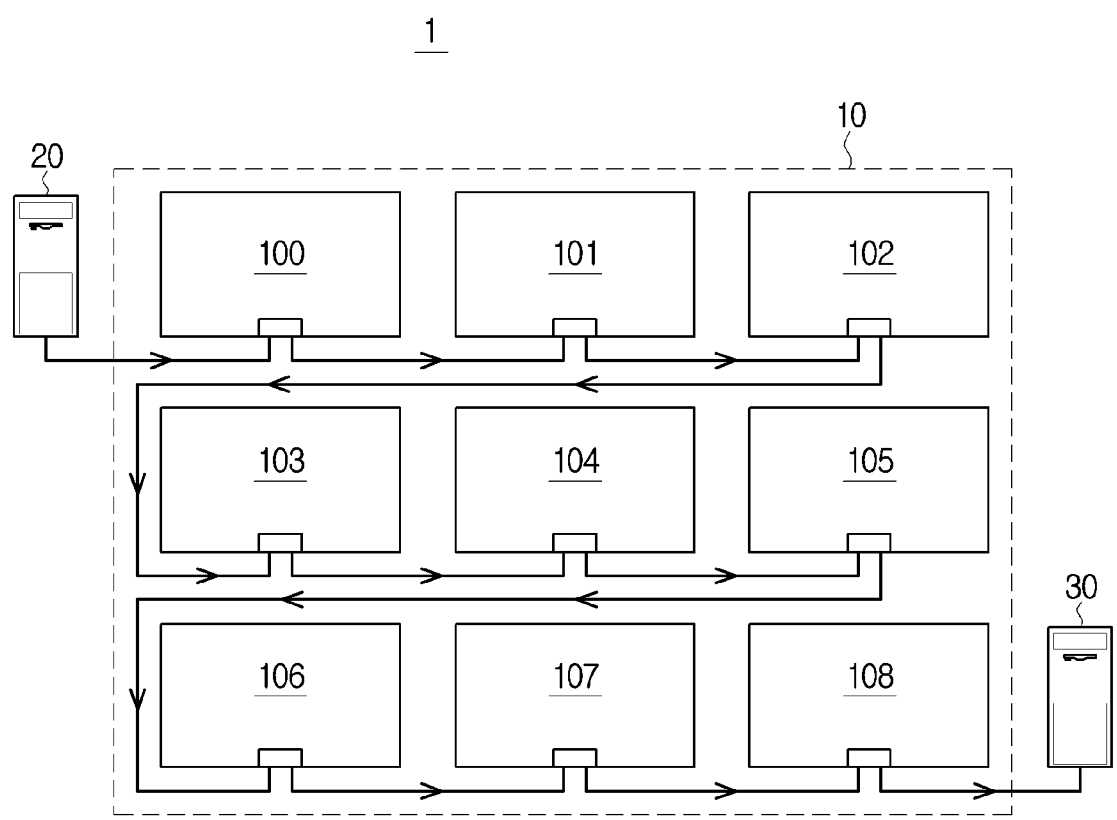
FIG. 9 illustrates a flow of image frame data according to the operation of the transmission/reception connector bundle shown in FIG. 7.
Figure 10:
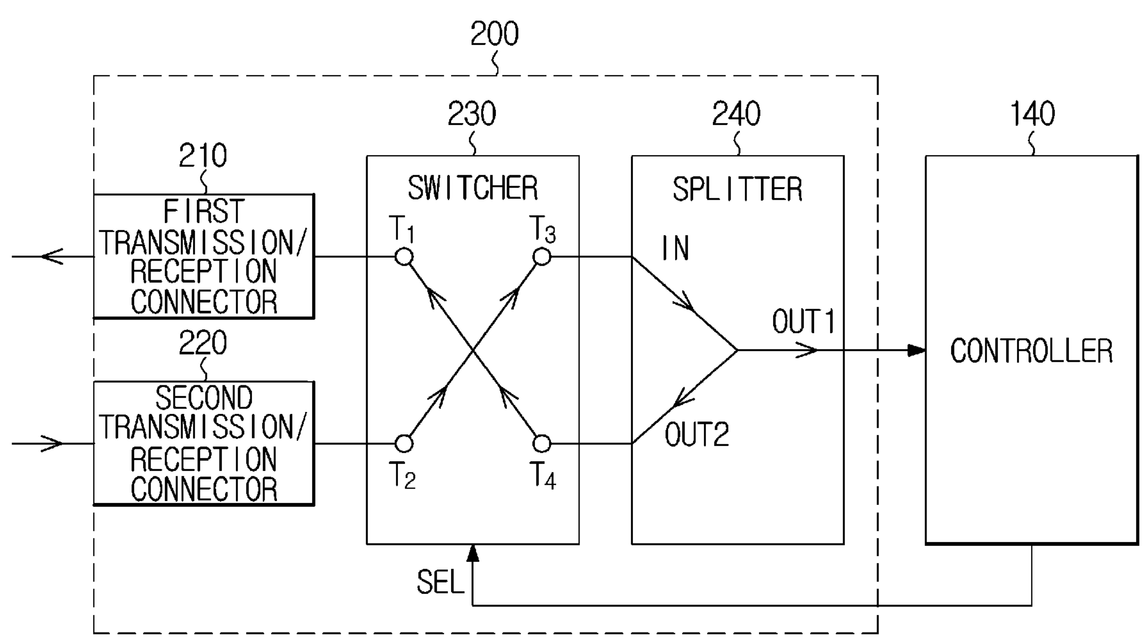
FIG. 10 illustrates another example of the operation of the transmission/reception connector bundle by the image source selection operation shown in FIG. 6.
Figure 11:
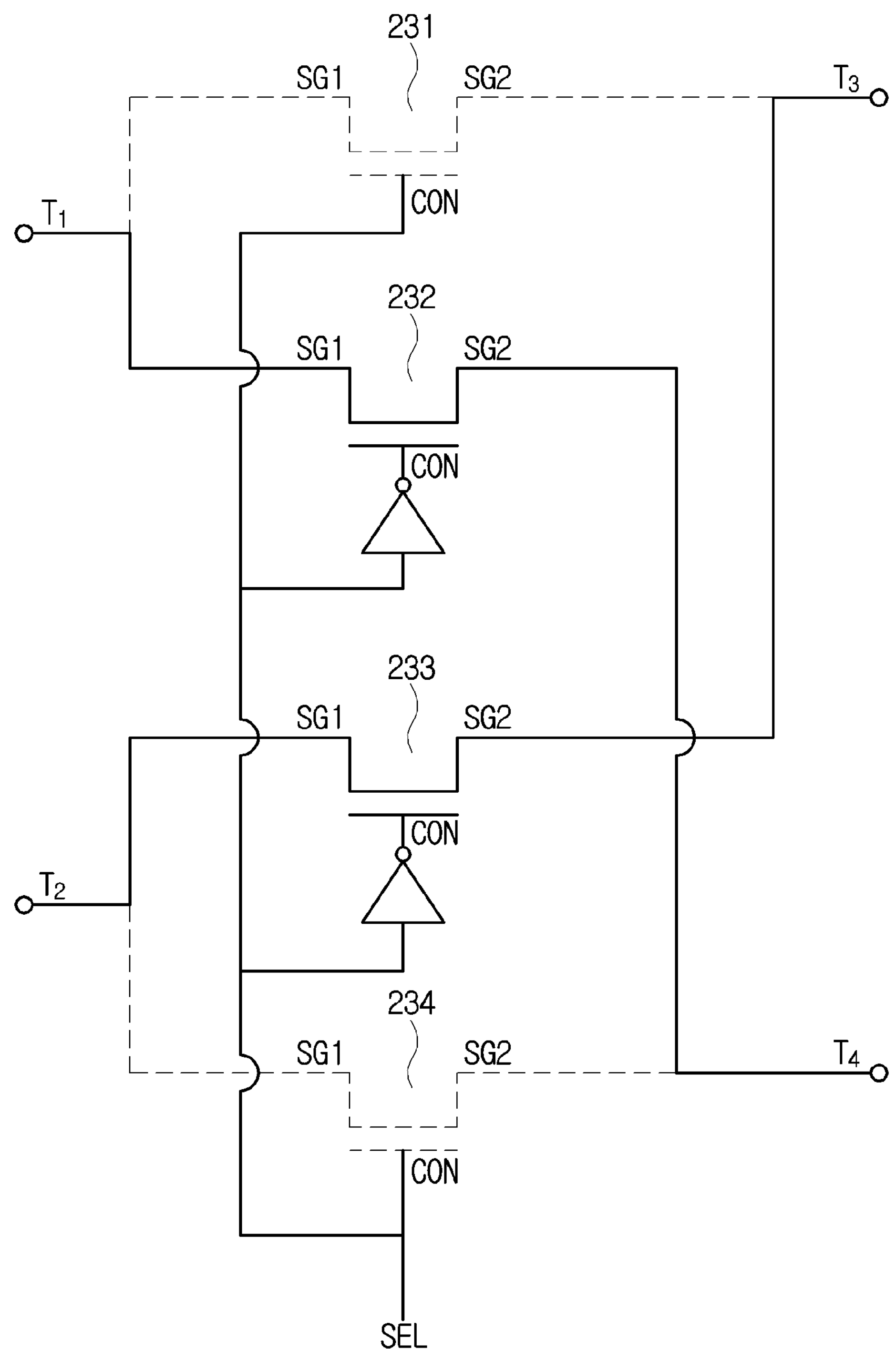
FIG. 11 illustrates an operation of the switcher by the operation of the transmission/reception connector bundle shown in FIG. 10.
Figure 12:
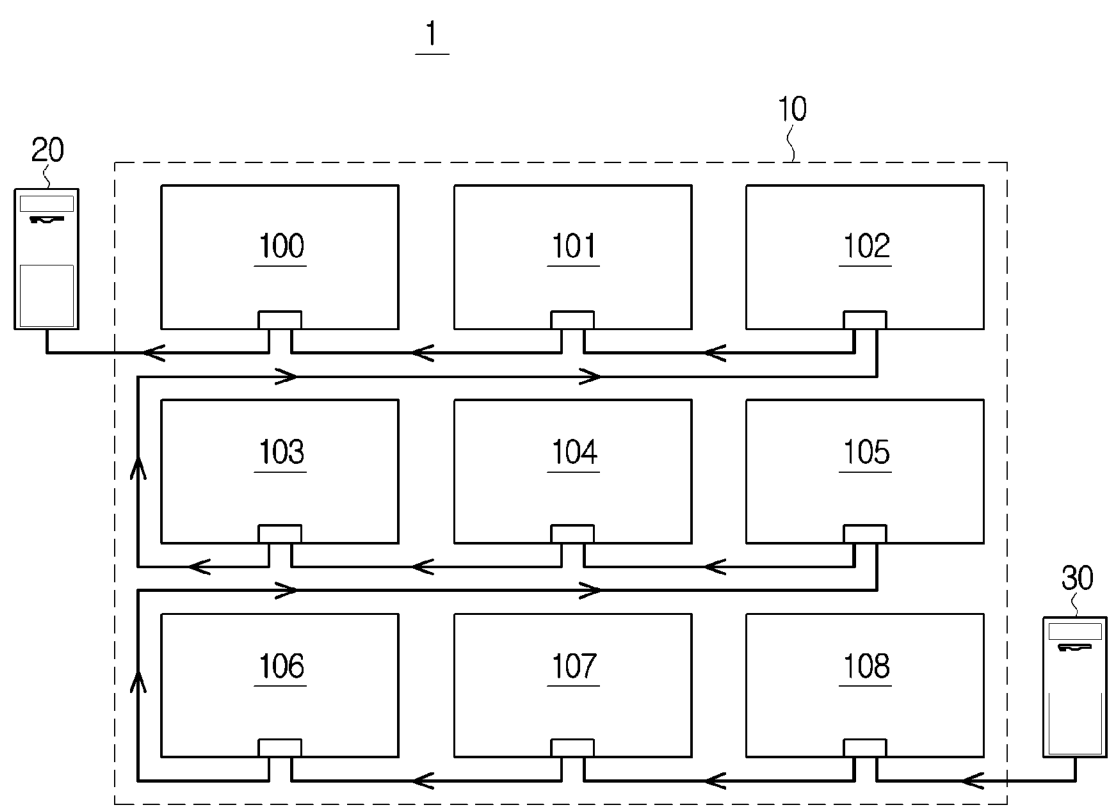
FIG. 12 illustrates a flow of image frame data by the operation of the transmission/reception connector bundle shown in FIG. 10.

FIG. 6 illustrates an example of an image source selection operation of a display device according to an embodiment. FIG. 7 illustrates an example of an operation of a transmission/reception connector bundle according to the image source selection operation shown in FIG. 6. FIG. 8 illustrates an operation of a switcher according to the operation of the transmission/reception connector bundle shown in FIG. 7. FIG. 9 illustrates a flow of image frame data according to the operation of the transmission/reception connector bundle shown in FIG. 7. FIG. 10 illustrates another example of the operation of the transmission/reception connector bundle according to the image source selection operation shown in FIG. 6. FIG. 11 illustrates an operation of the switcher according to the operation of the transmission/reception connector bundle shown in FIG. 10. FIG. 12 illustrates a flow of image frame data according to the operation of the/transmission/reception connector bundle shown in FIG. 10.

Referring to FIGS. 6, 7, 8, 9, 10, 11 and 12, an image source selection operation 1000 of the display device 100 is described.

The display device 100 receives image frame data through the first transmission/reception connector 210 and outputs image frame data through the second transmission/reception connector 220 (1010).

The first transmission/reception connector 210 may be connected to a first external device, and the second transmission/reception connector 220 may be connected to a second external device. Here, the first external device represents one of the first and second image source devices and the first to eighth display devices, and the second external device represents another one of the first and second image source devices and the first to eighth display devices.

The controller 140 may output a first selection signal to the switcher 230. In response to the first selection signal of the controller 140, the switcher 230 connects the first terminal T1 to the third terminal T3, and connects the second terminal T2 to the fourth terminal T4 as shown in FIG. 7.

For example, as illustrated in FIG. 8, the switcher 230 may receive the first selection signal through the selection terminal SEL.

The first selection signal may be input to the first switch 231 provided between the first terminal T1 and the third terminal T3 and the fourth switch 234 provided between the second terminal T2 and the fourth terminal T4. In response to the first selection signal, the first switch 231 and the fourth switch 234 are closed (or turned on), the first terminal T1 and the third terminal T3 are electrically connected to each other, and the second terminal T2 and the fourth terminal T4 may be electrically connected to each other.

In addition, the first selection signal is input to the first inverter 235 and the second inverter 236, and the first inverter 235 and the second inverter 236 may output a second selection signal. The second selection signals output from the first inverter 235 and the second inverter 236 are input to the second switch 232 provided between the first terminal T1 and the fourth terminal T4 and the third switch 233 provided between the second terminal T2 and the third terminal T3. In response to the second selection signal, the second switch 232 and the third switch 233 are opened (or turned off), the first terminal T1 and the fourth terminal T4 are electrically disconnected from each other and the second terminal T2 and the third terminal T3 may be electrically disconnected from each other.

As a result, the image frame data received through the first transmission/reception connector 210 is provided through the first terminal T1 and the third terminal T3 of the switcher 230 to the first input terminal IN1 of the splitter 240. The splitter 240 splits (or copies) the image frame data input through the first input terminal IN1 into two pieces of identical image frame data, and output one of the two pieces of image frame data to the controller 140 through the first output terminal OUT1 and outputs the other one of the two pieces of image frame data to the switcher 230 through the second output terminal OUT2. The image frame data output from the splitter 240 may be provided to the second transmission/reception connector 220 through the fourth terminal T4 and the second terminal T2 of the switcher 230, and may be output to the outside through the second transmission/reception connector 220.

In addition, the display device 100 may receive image frame data from the first external device and transmit image frame data to the second external device.

Referring to FIG. 9, the display device 100 may be connected to the first image source device 20 serving as the first external device and may be connected to the first display device 101 serving as the second external device. Specifically, the first transmission/reception connector 210 of the display device 100 may be connected to the first image source device 20, and the second transmission/reception connector 220 of the display device 100 may be connected to the first display device 101.

Accordingly, the image frame data output from the first image source device 20 is input to the display device 100, and the display device 100 may display a part of an image corresponding to the image frame data of the first image source device 20. The image frame data output from the first image source device 20 is input via the display device 100 to the first display device 101, and the first display device 101 may display a part of the image corresponding to the image frame data.

In addition, since the first display device 101 is connected to the display device 100 and the second display device 102, the image frame data output from the first image source device 20 is transmitted sequentially through the display device 100 and the first display device 101 to the second display device 102, and the second display device 102 may display a part of the image corresponding to the image frame data.

In the same manner, the third, the fourth, the fifth, the sixth, the seventh, and the eighth display devices 103 to 108 may receive the image frame data of the first image source device 20 from the second, the third, the fourth, the fifth, the sixth, and the seventh devices 102 to 107, respectively. Each of the third to eighth display devices 103 to 108 may display a part of the image corresponding to the image frame data of the first image source device 20. As a result, the video wall 10 may display the image corresponding to image frame data output from the first image source device 20 as a whole.

In this case, the second image source device 30 may output the same image frame data as the image frame data of the first image source device 20, and the second image source device 30 may be connected to the eighth display device 108. However, the image frame data output from the second image source device 30 is input to the output terminal of the splitter included in the eighth display device 108. Accordingly, the image frame data output from the second image source device 30 is neither input to the controller of the eighth display device 108 nor transmitted to the seventh display device 107.

Thereafter, the display device 100 determines whether reception of the image frame data is interrupted (1020).

The controller 140 may determine whether the reception of the image frame data is interrupted through the transmission/reception connector bundle 200. Specifically, the controller 140 may receive transmission/reception definition data indicating transmission/reception of image frame data together with the image frame data through the transmission/reception connector bundle 200. The controller 140 may determine whether the reception of the image frame data is interrupted based on whether the transmission/reception definition data is received.

For example, the transmission/reception connector bundle 200 may include a HDMI terminal, and the controller 140 may receive image frame data through TMDS Data 0+, TMDS Data 0−, TMDS Data 1+, and TMDS Data 1−, TMDS Data 2+ and TMDS Data 2− pins, receive clock signals through TMDS Clock+ and TMDS Clock− pins, and receive control signals through Consumer Electronics Control (CEC) pins. When the display device 100 continues connection with the first image source device 20 and the first image source device 20 operates normally, the controller 140 may continuously receive the clock signals. Accordingly, when a clock signal is not received through the TMDS Clock+ and TMDS Clock− pins, the controller 140 determines disconnection between the display device 100 and the first image source device 20, or malfunction of the first image source device 20.

In this way, the controller 140 may not only determine the interruption of reception of the image frame data but also determine the disconnection between the video wall 10 and the first image source device 20 or the malfunction of the first image source device 20, based on reception of the transmission/reception definition data.

When it is not determined that the reception of the image frame data is interrupted (No in operation 1020), the display device 100 determines whether the content has ended (1030).

When the reception of the image frame data continues, the controller 140 may determine whether the content (for example, video contents, such as a movie or a drama) corresponding to the image frame data received from the first image source device 20 has ended.

The controller 140 may determine whether the content has ended based on metadata included in the image frame data received from the first image source device 20. The meta data may include information about an image frame, a scene, and/or content corresponding to the image frame data. At the end of the content, the image frame data may include metadata indicating the end of the content, and the controller 140 may determine that the content has ended based on the metadata indicating the end of the content.

When it is not determined that the content has ended (No in operation 1030), the display device 100 continues to determine the interruption of reception of the image frame data (1020).

When it is determined that the content has ended (YES in operation 1030), the display device 100 waits for content to be received (1040).

When the content has ended, the first and second image source devices 20 and 30 may automatically or manually (depending on a user input) repeat reproducing the previous content or reproduce new content. The display device 100 may wait for image frame data to be received from the first image source device 20 or the second image source device 30.

When it is determined that the reception of the image frame data is interrupted (YES in operation 1020), the display device 100 receives the image frame data through the second transmission/reception connector 220 and outputs the image frame data through the first transmission/reception connector 210 (1050).

When the first image source device 20 malfunctions (or stops working) or the connection between the display device 100 and the first image source device 20 is disconnected, the reception of image frame data from the first image source device 20 may be interrupted.

When the reception of the image frame data is interrupted while receiving the image frame data from the first external device, the controller 140 may control the transmission/reception connector bundle 200 to automatically or manually (depending on a user input) receive the image frame data from the second external device.

For example, when the reception of the image frame data is interrupted, the controller 140 may immediately output a second selection signal to the switcher 230 to receive the image frame data transmitted from the second image source device 30.

As another example, when the reception of the image frame data is interrupted, the controller 140 may display an image message indicating the interrupted reception of the image frame data through the image display 150 or may output an acoustic message indicating interrupted reception of the image frame data through the sound outputter 160. The user may input a user input to the display device 100 to receive the image frame data from the second external device in response to the image message and/or the audio message. The controller 140 may output a second selection signal to the switcher 230 to receive the image frame data transmitted from the second image source device 30 in response to the user input.

In addition, in response to the second selection signal of the controller 140, the switcher 230 connects the first terminal T1 to the fourth terminal T4 and connects the second terminal T2 to the third terminal T3 as shown in FIG. 10.

For example, as shown in FIG. 11, the switcher 230 may receive the second selection signal through the selection terminal SEL.

The second selection signal may be input to the first switch 231 provided between the first terminal T1 and the third terminal T3 and also to the fourth switch 234 provided between the second terminal T2 and the fourth terminal T4. In response to the second selection signal, the first switch 231 and the fourth switch 234 are opened (or turned off), the first terminal T1 and the third terminal T3 are electrically disconnected from each other and the second terminal T2 and the fourth terminal T4 are electrically disconnected from each other.

In addition, the second selection signals are input to the first inverter 235 and the second inverter 236, and the second inverter 236 and the second inverter 236 may output first selection signals. The first selection signals output from the first inverter 235 and the second inverter 236 are input to the second switch 232 provided between the first terminal T1 and the fourth terminal T4 and the third switch 233 provided between the second terminal T2 and the third terminal T3. In response to the first selection signal, the second switch 232 and the third switch 233 are closed (or turned on), the first terminal T1 and the fourth terminal T4 are electrically connected to each other, and the second terminal T2 and the third terminal T3 may be electrically connected to each other.

As a result, the image frame data received through the second transmission/reception connector 220 is provided to the first input terminal IN1 of the splitter 240 sequentially through the second terminal T1 and the third terminal T3 of the switcher 230. The splitter 240 splits (or copies) the image frame data received through the first input terminal IN1 into two pieces of identical image frame data, and outputs one of the two pieces of image frame data to the controller 140 through the first output terminal OUT1 and outputs the other one of the two pieces of image frame data to the switcher 230 through the second output terminal OUT2. The image frame data output from the splitter 240 may be provided to the first transmission/reception connector 210 through the fourth terminal T4 and the first terminal T1 of the switcher 230, and also may be output to the outside through the second transmission/reception connector 220.

In addition, the display device 100 may receive image frame data from the second external device and transmit image frame data to the first external device.

Referring to FIG. 12, the display device 100 may be connected to the first image source device 20 serving as the first external device and may be connected to the first display device 101 serving as the second external device. Specifically, the first transmission/reception connector 210 of the display device 100 may be connected to the first image source device 20, and the second transmission/reception connector 220 of the display device 100 may be connected to the first display device 101.

Accordingly, the display device 100 may receive image frame data from the first display device 101. The first display device 101 may detect interruption of the reception of the image frame data from the first image source device 10 and may receive the image frame data from the second display device 102. The second display device 102 may also detect interruption of the reception of the image frame data from the first image source device 10 and receive the image frame data from the third display device 103. In this way, the third, fourth, fifth, sixth, and seventh display devices 103, 104, 105, 106, and 107 may receive the image frame data from the fourth, fifth, sixth, seventh, and eighth display devices 104, 105, 106, 107, and 108, respectively. Also, the eighth display device 108 may receive image frame data from the second image source device 30. Each of the display device 100 and the first to eighth display devices 101 to 108 may receive the image frame data of the second image source device 30 and may display a part of an image corresponding to the image frame data of the second image source device 30. As a result, the video wall 10 may display the image corresponding to the image frame data output from the second image source device 30 as a whole.

In this case, since the image frame data of the second image source device 30 is the same as the image frame data of the first image source device 20, the image displayed on the video wall 10 is not changed.

In this way, the video wall 10 having displayed the image corresponding to the image frame data of the first image source device 20 may receive the image frame data from the second image source device 30, and may display the image corresponding to the image frame data of the second image source device 30.

Thereafter, the display device 100 determines whether the reception of the image frame data is interrupted (1060).

The controller 140 may determine whether the reception of the image frame data is interrupted through the transmission/reception connector bundle 200. Specifically, the controller 140 may determine whether the reception of the image frame data is interrupted according to whether the transmission/reception definition data is received, and also may determine the disconnection between the video wall 10 and the second image source device 30 or the malfunction the second image source device 30, based on whether the reception of the image frame data is interrupted.

Operation 1060 may be the same as operation 1020.

When it is not determined that the reception of the image frame data is interrupted (No in operation 1060), the display device 100 determines whether the content has ended (1070).

Operation 1070 may be the same as operation 1030.

When it is not determined that the content has ended (No in operation 1070), the display device 100 continues to determine whether the reception of the image frame data is interrupted (1050).

When it is determined that the content has ended (YES in operation 1070), the display device 100 waits for content to be received (1080).

Operation 1080 may be the same as operation 1040.

When it is determined that the reception of the image frame data is interrupted (YES in operation 1060), the display device 100 warns the error of the content reception (1090).

When the reception of the image frame data from both the first image source device 20 and the second image source device 30 is interrupted, the controller 140 may determine an error of the display system 1 in whole.

Accordingly, the controller 140 may warn the user of an error in the content reception. For example, the controller 140 may display an image message indicating an error in content reception on the image display 150 or output an audio message indicating an error in content reception through the sound outputter 160.

As described above, the display device 100 and the first to eighth display devices 101 to 108 are sequentially connected between the first image source device 20 and the second image source device 30. The display device 100 and the first to eighth display devices 101 to 108 may sequentially transmit image frame data of the first image source device 20 in a first direction from the display device 100 to the eighth display device 108, or may sequentially transmit image frame data of the second image source device 30 in a second direction from the eighth display device 108 to the display device 100.

In addition, the display device 100 and the first to eighth display devices 101 to 108 may sequentially receive image frame data from the first image source device 20, and the display device 100 and the first to eighth display devices 101 to 108 may display an image corresponding to the image frame data of the first image source device 20 as a whole.

When the first image source device 20 malfunctions (or stops working) or the connection with the first image source device 20 is disconnected, the eighth to first display devices 108 to 101 and the display device 100 may sequentially receive image frame data from the second image source device 30, and the eighth to first display devices 108 to 101 and the display device 100 may display an image corresponding to the image frame data of the second image source device 30 as a whole.

With such an operation, even when the image source device 20 or 30 malfunctions (or stops working) or the connection with the image source device 20 or 30 is disconnected, the video wall 10 may continue displaying an image of content stored in the image source devices 20 and 30.

The above description has been made on an example of interruption of the image frame data reception caused by the malfunction of the image source device 20 or 30 (or stop of operation) or the disconnection with the image source device 20 or 30, but the interruption of the image frame data reception is not limited thereto. For example, the interruption of the image frame data reception may be caused by the disconnection between the display device 100 and the first to eighth display devices 101 to 108.

Figure 13:
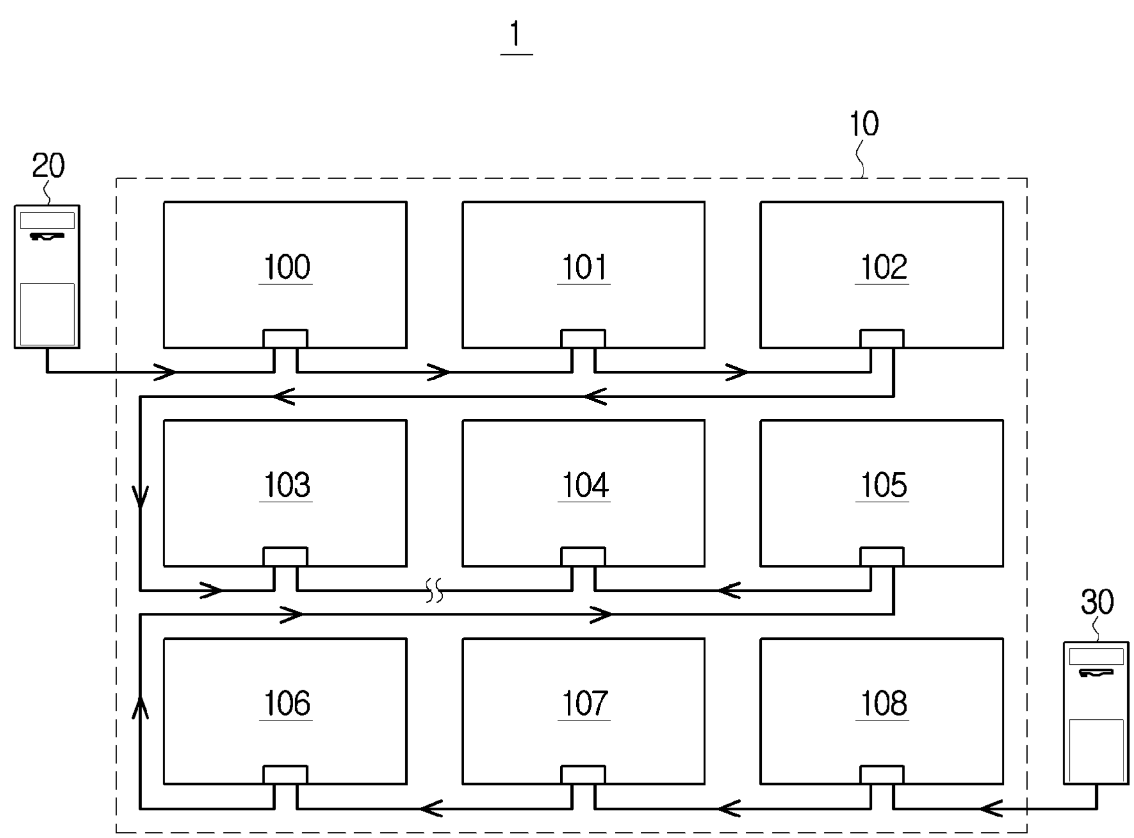
FIG. 13 illustrates another example of a flow of image frame data in a display system according to an embodiment.

FIG. 13 illustrates another example of a flow of image frame data in a display system according to an embodiment.

Referring to FIG. 13, the display device 100 and the first to eighth display devices 101 to 108 are sequentially between the first image source device 20 and the second image source device 30. In addition, the display device 100 and the first to eighth display devices 101 to 108 sequentially transmit image frame data of the first image source device 20 in a direction from the display device 100 to the eighth display device 108.

In this case, for example, the connection between the third display device 103 and the fourth display device 104 may be disconnected. As a result, the display device 100 and the first to third display devices 101 to 103 may still receive the image frame data of the first image source device 20, while the fourth to eighth display devices 104 to 108 may not receive the image frame data of the first image source device 20. In other words, the fourth to eighth display devices 104 to 108 may detect the interruption of the image frame data reception.

Accordingly, the fourth to eighth display devices 104 to 108 may change the reception direction of the image frame data. In other words, the fourth to eighth display devices 104 to 108 may switch from receiving the image frame data of the first image source device 20 through the first transmission/reception connector to receiving the image frame data of the second image source device 30 through the second transmission/reception connector. The image frame data of the second image source device 30 may be sequentially transmitted from the eighth display device 108 to the fourth display device 104.

Since the first image source device 20 and the second image source device 30 output the same image frame data, the image frame data input to the display device 100 and the first to third display devices 101 to 103 may be the same as the image frame data input to the fourth to eighth display devices 104 to 108. Also, the display device 100, the first to third display devices 101 to 103, and the fourth to eighth display devices 104 to 108 may display one image as a whole.

As described above, even when the connection between the display devices 100 to 108 within the video wall 10 is disconnected, the display device 100 and the first to eighth display devices 101 to 108 may continuously display an image included in content.

The above description has been made in relation that the display devices 100 to 108 automatically change between the image source devices 20 and 30, but the change of the image source device 20 or 30 may be performed by a user input.

Figure 14:
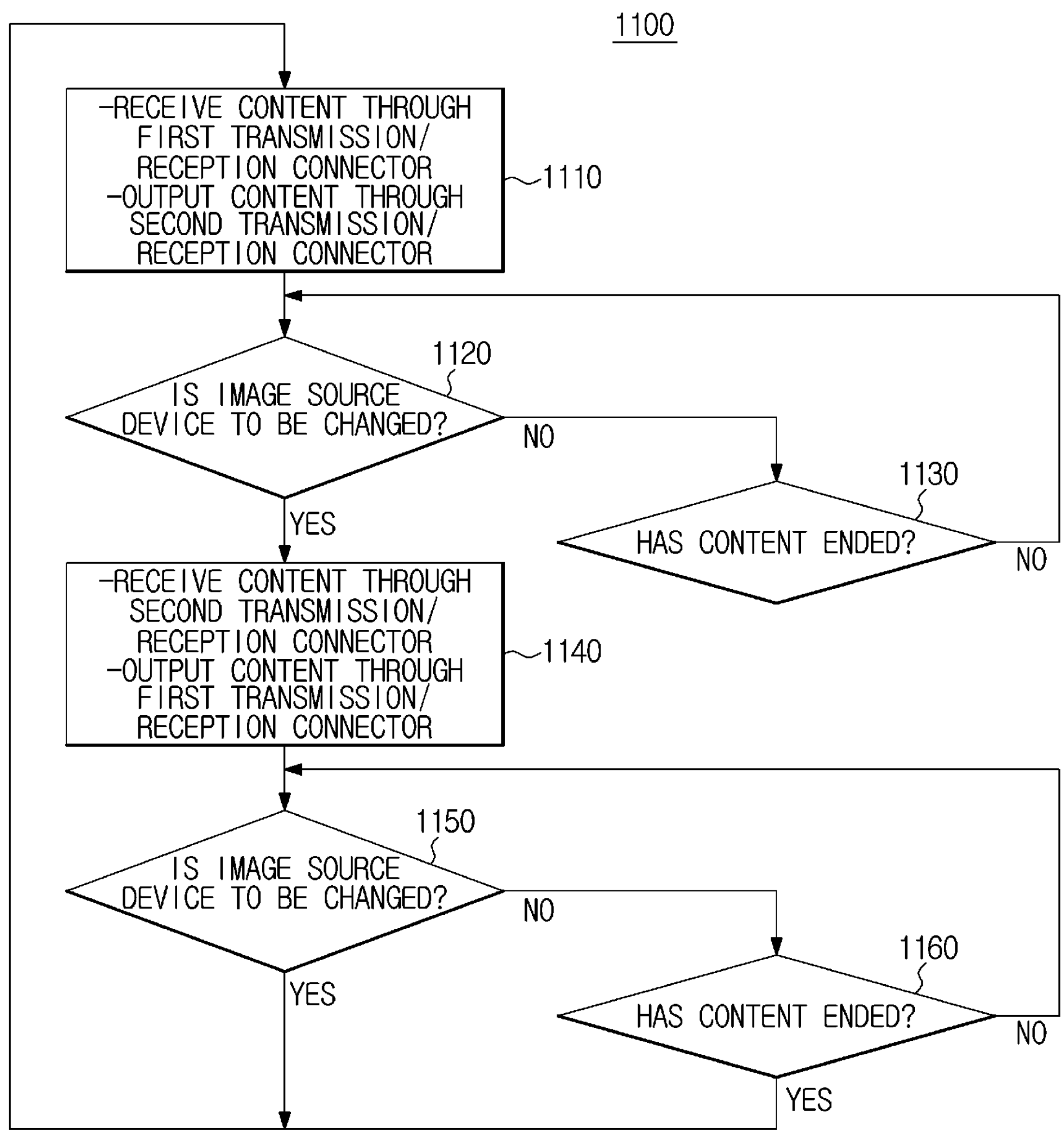
FIG. 14 illustrates another example of an image source selection operation of a display device according to an embodiment.

FIG. 14 illustrates another example of an image source selection operation of a display device according to an embodiment.

Referring to FIG. 14, an image source selection operation 1100 of the display device 100 is described.

The display device 100 receives image frame data through the first transmission/reception connector 210 and outputs image frame data through the second transmission/reception connector 220 (1110).

Operation 1110 may be the same as operation 1010 illustrated in FIG. 6.

Thereafter, the display device 100 determines whether to change the image source device 20 or 30 (1120).

The user may input a user input with regard to changing the image source device 20 or 30 to the display devices 100 to 108 or the image source devices 20 and 30.

For example, the first image source device 20 and the second image source device 30 may output different pieces of image frame data, and the first image source device 20 may output image frame data of a first image and the second image source device 30 may output image frame data of a second image. While the first image is being displayed on the video wall 10, the user may input a user input for changing the image displayed on the video wall 10 from the first image to the second image.

In addition, the first image source device 20 and the second image source device 30 may output the same image frame data. When the quality of an image by the image frame data of the first image source device 20 is low, the user may input a user input to change the image displayed on the video wall 10 to an image by the image frame data of the second image source device 30.

The user input with regard to changing the image source device 20 or 30 may be directly input to each of the display devices 100 to 108. The display devices 100 to 108 may share a single remote controller 112*a*, and an user input inputted to the remote controller 112*a* may be transmitted to all of the display devices 100 to 108. The display devices 100 to 108 may receive a user input with regard to changing the image source device 20 or 30 through the signal receiver 112 of the user inputter 110.

The user input with regard to changing the image source device 20 or 30 may be input to the display devices 100 to 108 via the image source device 20 or 30. For example, the transmission/reception connector bundle 200 may include a HDMI terminal, and the display device 100 may receive a control signal through a CEC pin. In other words, the image source device 20 or 30 may receive a user input and transmit data on the user input to the display devices 100 to 108 through the CEC pin. The display devices 100 to 108 may receive a user input with regard to changing the image source device 20 or 30 through the CEC pin of a HDMI terminal.

When it is not determined that the image source device 20 or 30 is to be changed (No in operation 1120), the display device 100 determines whether the content has ended (1130).

When a user input with regard to changing the image source device 20 or 30 is not input, the display device 100 may determine whether the content has ended.

Operation 1130 may be the same as operation 1030 illustrated in FIG. 6.

When the content has not ended (No in operation 1130), the display device 100 repeats operation 1120 determining change of the image source device 20 or 30.

When it is determined that the image source device 20 or 30 is to be changed (YES in operation 1120) or the content has ended (YES in operation 1130), the display device 100 receives image frame through the second transmission/reception connector 220 and output the image frame data through the first transmission/reception connector 210 (1140).

When a user input with regard to changing the image source device 20 or 30 is input, the display device 100 controls the content receiver 120 to receive image frame data from the second image source device 30.

In addition, when first content reproduced by the first image source device 20 has ended, the display device 100 may control the content receiver 120 to receive image frame data of second content from the second image source device 30.

Operation 1140 may be the same as operation 1050 illustrated in FIG. 6.

Thereafter, the display device 100 determines whether to change the image source device 20 or 30 (1150).

Operation 1150 may be the same as operation 1120.

When it is not determined that the image source device 20 or 30 is to be changed (NO in operation 1150), the display device 100 determines whether the content has ended (1160).

Operation 1160 may be the same as operation 1130 illustrated in FIG. 6.

When the content has not ended (No in operation 1160), the display device 100 repeats operation 1150 determining change of the image source device 20 or 30.

When it is determined that the image source device 20 or 30 is to be changed (YES in operation 1150) or the content has ended (YES in operation 1160), the display device 100 displays image frame through the first transmission/reception connector 210 and output the image frame data through the second transmission/reception connector 220 (1110).

When a user input with regard to changing the image source device 20 or 30 is input, the display device 100 controls the content receiver 120 to receive image frame data from the first image source device 20.

In addition, when the second content reproduced by the second image source device 30 has end, the display device 100 may control the content receiver 120 to receive image frame data of the first content from the first image source device 20.

As described above, the display device 100 and the first to eighth display devices 101 to 108, in response to receiving a user input with regard to changing the image source device 20 or 30 while receiving image frame data from the first image source device 20, may receive the image frame data from the second image source device 30, and the display device 100 and the first to eighth display devices 101 to 108 may display the image corresponding to the image frame data of the second image source device 30 as a whole. In addition, the display device 100 and the first to eighth display devices 101 to 108, when the first content of the first image source device 20 has ended, may receive image frame data of second content from the second image source device 30 and display an image of the second content as a whole.

With such an operation, the user may easily select the image source device 20 or 30 of the video wall 10, and the video wall 10 may continue displaying images even when the content of the image source device 20 or 30 has ended.

Figure 15:
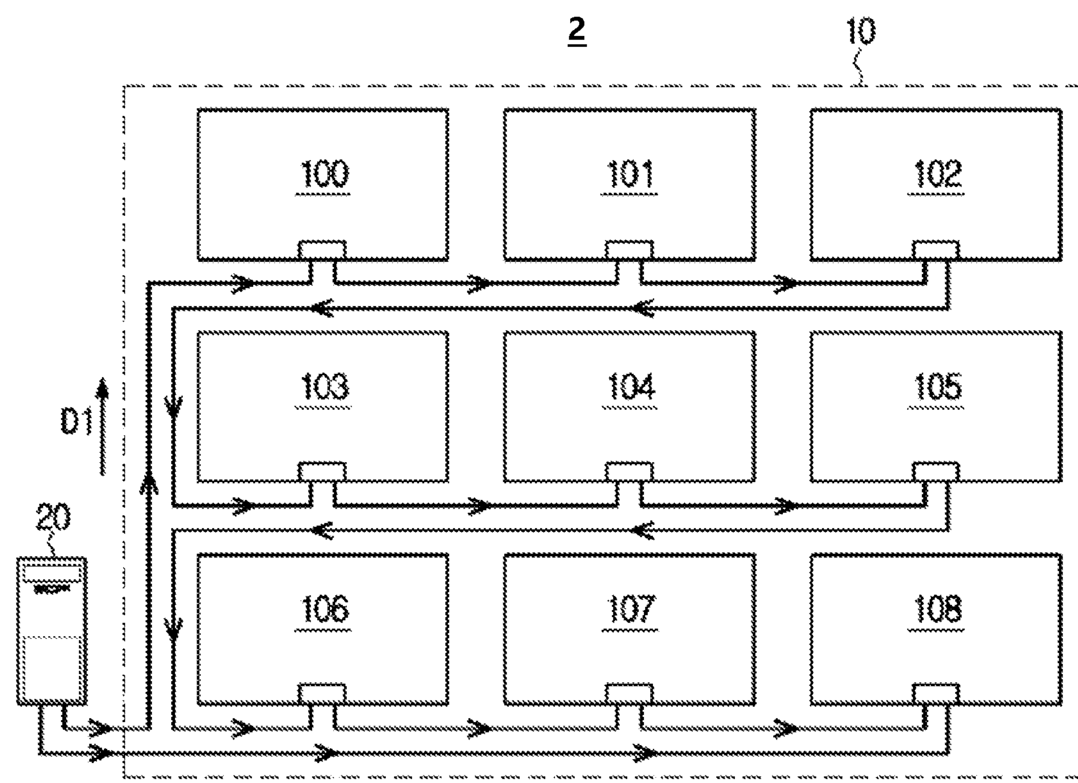
FIGS. 15 and 16 illustrate a display system according to an embodiment.
Figure 16:
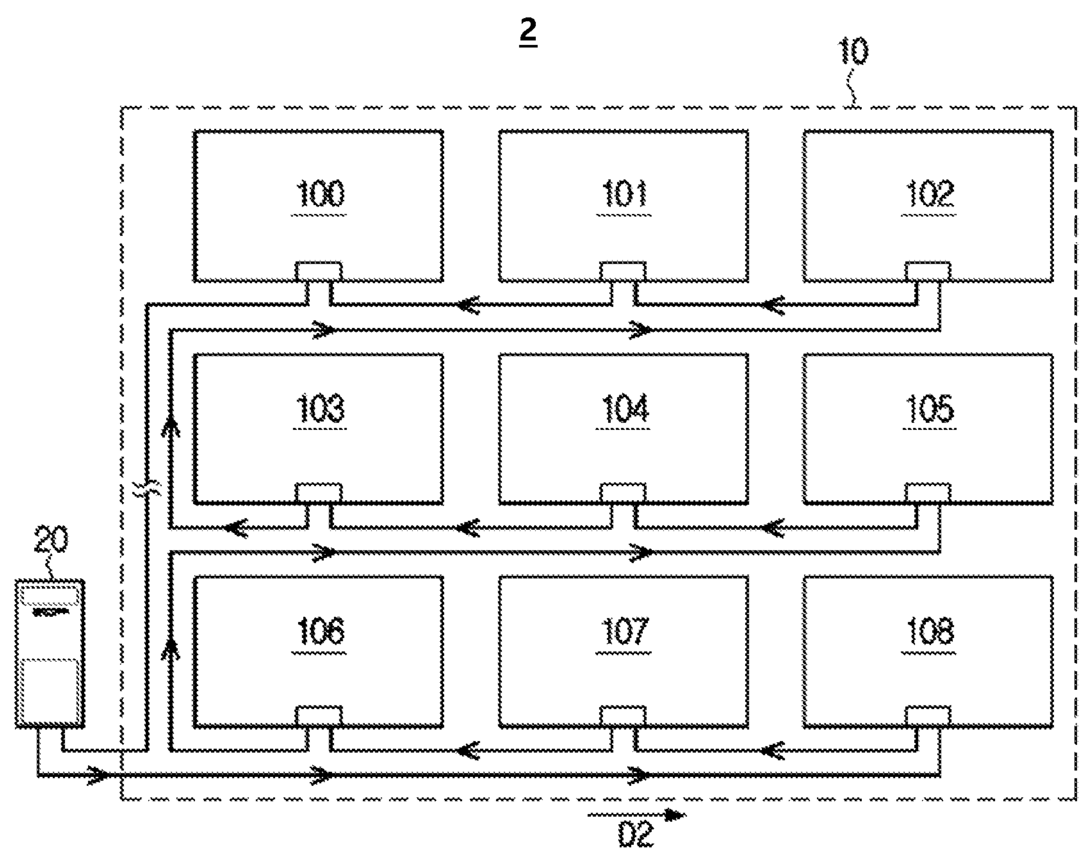

FIGS. 15 and 16 illustrate a display system according to an embodiment.

Referring to FIGS. 15 and 16, a display system 2 includes a video wall 10 for visually displaying an image and a first image source device 20 for providing the video wall 10 with image frame data.

The video wall 10 and the first image source device 20 may be the same as those shown in FIGS. 1 to 14.

Compared with the display system 1 shown in FIG. 1, the display system 2 includes a first image system 20 connected to a display device 100 and an eighth display device 108 of the video wall 10 and outputting image frame data to each of the display device 100 and the eighth display device 108. Also, first to seventh display devices 101 to 107 may be sequentially connected between the display device 100 and the eighth display device 108.

The display device 100 and the first to eighth display devices 101 to 108 sequentially transmit image frame data in a first direction from the display device 100 to the eighth display device 108, or sequentially transmit image frame data in a second direction from the eighth display device 108 to the display device 100.

In addition, as illustrated in FIG. 15, the display device 100 and the first to eighth display devices 101 to 108 sequentially receives image frame data in the first direction D1 from the first image source device 20, and display an image corresponding to the image frame data of the first image source device 20 as a whole.

When the connection between the first image source device 20 and the display device 100 is disconnected, the eighth to first display devices 108 to 101 and the display device 100 may sequentially receive image frame data in the second direction D from the first image source device 20, and the display device 100 and the first to eighth display devices 101 to 108 may still receive the image corresponding to the image frame data of the first image source device 20.

In addition, even when the connection between the display device 100 and the first to eighth display devices 101 to 108 is disconnected, some display devices may receive the image frame data from the first image source device 20 in the first direction D1, and some other display devices may receive the image frame data from the first image source device 20 in the second direction D2.

With such an operation, even when the connection with the first image source device 20 is disconnected, the video wall 10 may continue displaying the image of the content stored in the first image source device 20.

Figure 17:
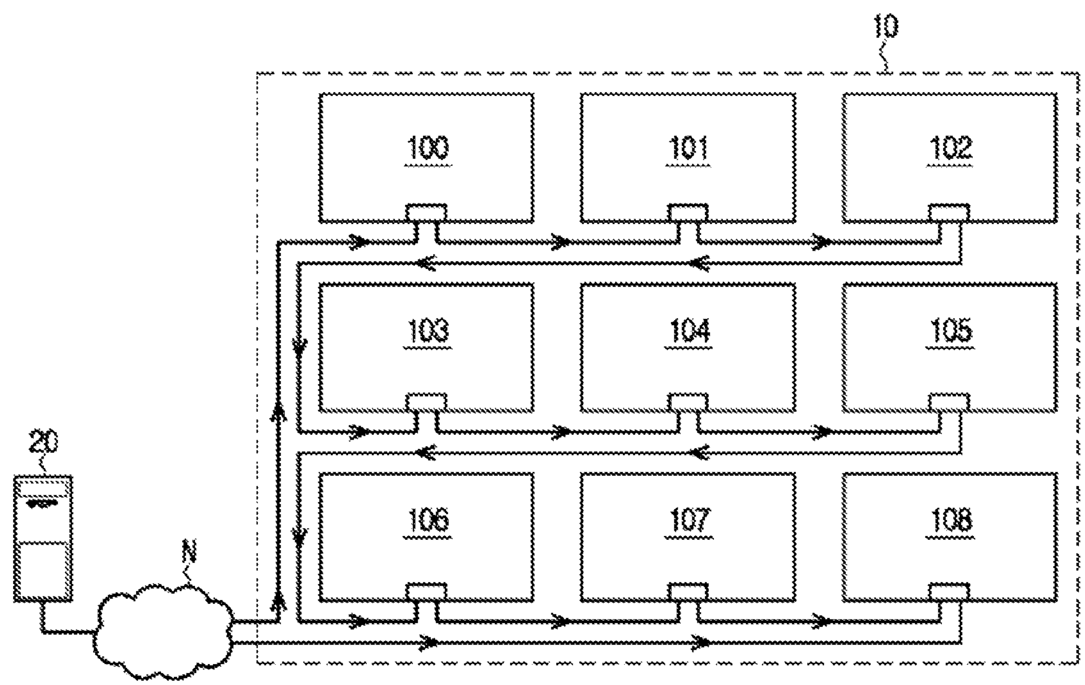
FIG. 17 illustrates a display system according to an embodiment.

FIG. 17 illustrates a display system according to an embodiment.

Referring to FIG. 17, a display system 3 includes a video wall 10 for visually displaying an image, and a first image source device 20 connected to the video wall 10 through a communication network N.

The first image source device 20 may output content data including a video signal and an audio signal. For example, the content data may be compressed by a video compression standard, such as MPEG HEVC, etc., and the first image source device 20 may transmit the compressed content data to the video wall 10 through the communication network N.

The communication network (N) may include both wired and wireless communication networks. The wired communication network includes the Internet, such as a cable network or a telephone network, and the wireless communication network may include a wireless network using Wi-Fi, Bluetooth, and Zigbee. Furthermore, the wireless network may include a mobile communication service network, such as CDMA, WCDMA, GSM, Long Term Evolution (LET), and WiBro. The communication network N is not limited thereto, and may include a communication network of communication services to be implemented in the future. For example, the wireless communication network may include an access point (AP), and the access point may be connected to the Internet through a wired communication network provided by an Internet service provider. In addition, the access point may be substituted with a hub, router, switch, gateway, or the like.

The video wall 10 may receive content data from the first image source device 20 through a communicator 130 from the communication network N. The video wall 10 may display an image corresponding to the content data as a whole. The video wall 10 may include, for example, a display device 100 and first to eighth display devices 101 to 108, and the display device 100 and the first to eighth display devices 101 to 108 may be arranged in a matrix form of three rows and three columns.

The display device 100 may control the communicator 130 to receive the content data of the first image source device 20 through the communication network N, and the first display device 101 may receive the content data of the first image source device 20 from the display device 100. In the same manner, second, third, fourth, fifth, sixth, seventh, and eighth display devices 102 to 108 may receive the content data of the first image source device 20 from the first, second, third, fourth, fifth, sixth, and seventh display devices 101 to 107, respectively.

The display device 100 and the first to eighth display devices 101 to 108 may each decode the content data to convert the content data of the first image source device 20 into image frame data. For example, the content data may be compressed by a video compression standard such as MPEG HEVC, etc., and the display device 100 and the first to eighth display devices 101 to 108 may each restore image frame data from the compressed content data. Also, the display device 100 and the first to eighth display devices 101 to 108 may each display a part of an image corresponding to the image frame data.

In addition, when the connection between the display device 100 and the first image source device 20 through the communication network N is disconnected, the display device 100 may control the communicator 130 to receive the content data from the first display device 101. The eighth display device 108 may receive the content data of the first image source device 20 through the communication network N, and the seventh display device 107 may receive the content data of the first image source device 20 through the eighth display device 108. In the same manner, the sixth, fifth, fourth, third, second and first display devices 106 to 101 may receive the content data of the first image source device 20 through the seventh, sixth, fifth, fourth, third, and second display devices 107 to 102, respectively.

With such an operation, even when the connection with the first image source device 20 through the communication network N is disconnected, the video wall 10 may continue displaying the image corresponding to the content data of the first image source device 20.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

The invention claimed is:

1. A video wall comprising a plurality of display apparatuses, wherein at least one display apparatus of the plurality of display apparatuses comprise:

a display;

a content receiver configured to receive image data from one of a first display apparatus and a second display apparatus of the plurality of display apparatuses; and a controller configured to:

control the plurality of display apparatuses to display an image corresponding to the received image data, in response to receiving the image data from the first display apparatus, provide a first signal to the content receiver to receive the image data from the first display apparatus and provide the received image data to the second display apparatus, and in response to an interruption of the receiving of the image data from the first display apparatus, provide a second signal to the content receiver to receive the image data from the second display apparatus and provide the received image data to the first display apparatus, wherein the content receiver comprises:

a first connector connected to the first display apparatus;

a second connector connected to the second display apparatus;

a splitter configured to:

split the image data input through an input terminal of the splitter into a plurality of pieces of split image data, output one of the plurality of pieces of split image data to the controller, and output another one of the plurality of pieces of split image data through an output terminal of the splitter; and a switcher configured to:

in response to receiving the first signal, connect the first connector to the input terminal of the splitter while connecting the second connector to the output terminal of the splitter, and in response to receiving the second signal, connect the first connector to the output terminal of the splitter while connecting the second connector to the input terminal of the splitter.

2. The video wall of claim 1, wherein the controller is further configured to, based on detecting the interruption of the receiving of the image data from the first display apparatus, provide the second signal to the content receiver to receive the image data from the second display apparatus and provide the received image data to the controller and the first display apparatus.

3. The video wall of claim 2, wherein the controller is further configured to, based on detecting the interruption of the receiving of the image data from the first display apparatus, display a message indicating the interruption of the receiving of the image data through at least one of the display and a sound outputter and provide the second signal to the content receiver to receive the image data from the second display apparatus and provide the received image data to the controller and the first display apparatus according to a user input.

4. The video wall of claim 1, wherein the controller is further configured to:

provide the first signal to the switcher to transmit the image data received from the first connector to the splitter and output the other one of the plurality of pieces of split image data split by the splitter to the second connector; and provide the second signal to the switcher to transmit the image data received from the second connector to the splitter and output the other one of the plurality of pieces of split image data split by the splitter to the first connector.

5. The video wall of claim 1, wherein the switcher is configured to:

in response to receiving the first signal, connect the first connector to the input terminal of the splitter while connecting the second connector to the output terminal of the splitter, and in response to receiving the second signal, connect the first connector to the output terminal of the splitter while connecting the second connector to the input terminal of the splitter.

6. The video wall of claim 1, wherein the switcher comprises:

a first switch provided between the first connector and the input terminal of the splitter;

a second switch provided between the first connector and the output terminal of the splitter;

a third switch provided between the second connector and the input terminal of the splitter; and a fourth switch provided between the second connector and the output terminal of the splitter, wherein the first switch and the fourth switch are closed in response to the first signal of the controller, and are opened in response to the second signal of the controller, and the second switch and the third switch are opened in response to the first signal of the controller, and are closed in response to the second signal of the controller.

7. A display system comprising:

a first image source apparatus and a second image source apparatus configured to output image data; and a plurality of display apparatuses connected in series between the first image source apparatus and the second image source apparatus, and configured to receive the image data from one of the first image source apparatus and the second image source apparatus in a predetermined order, wherein at least one display apparatus of the plurality of display apparatuses comprise:

a display;

a content receiver configured to receive the image data from one of a first display apparatus and a second display apparatus of the plurality of display apparatuses; and a controller configured to:

control the display to display an image corresponding to the received image data, in response to receiving the image data from the first display apparatus, provide a first signal to the content receiver to receive the image data from the first display apparatus and provide the received image data to the second display apparatus, and in response to an interruption of the receiving of the image data from the first image source apparatus, provide a second signal to the content receiver to receive the image data from the second display apparatus and provide the received image data to the first display apparatus, wherein the content receiver comprises:

a first connector connected to the first display apparatus;

a second connector connected to the second display apparatus;

a splitter configured to:

split image data input through an input terminal of the splitter into a plurality of pieces of split image data, output one of the plurality of pieces of split image data to the controller, and output another one of the plurality of pieces of split image data through an output terminal of the splitter; and a switcher configured to:

in response to receiving the first signal, connect the first connector to the input terminal of the splitter while connecting the second connector to the output terminal of the splitter, and in response to receiving the second signal, connect the first connector to the output terminal of the splitter while connecting the second connector to the input terminal of the splitter.

8. The display system of claim 7, wherein the plurality of display apparatuses display an image corresponding to the image data received from the one of the first image source apparatus and the second image source apparatus as a whole.

9. The display system of claim 7, wherein the controller is further configured to, based on detecting the interruption of the receiving of the image data from the first display apparatus, provide the second signal to the content receiver to receive the image data from the second display apparatus and provide the received image data to the controller and the first display apparatus.

10. The display system of claim 7, wherein the controller is further configured to, based on detecting the interruption of the receiving of the image data from the first display apparatus, display a message indicating the interruption of the receiving of the image data through at least one of the plurality of display apparatuses and a sound outputter and provide the second signal to the content receiver to receive the image data from the second display apparatus and provide the received image data received to the controller and the first display apparatus according to a user input.

11. The display system of claim 7, wherein the first display apparatus is connected to the first image source apparatus, and the second display apparatus is connected to the second image source apparatus.

12. The display system of claim 11, wherein the plurality of display apparatuses are configured to:

receive the image data in an order of the first image source apparatus, the first display apparatus, the at least one display apparatus, and the second display apparatus, and based on the interruption of the receiving of the image data from the first image source apparatus, receive the image data in an order of the second image source device, the second display apparatus, the at least one display apparatus, and the first display apparatus.

* * * * *